United States Patent [19]
Montero

[11] Patent Number: 6,133,912
[45] Date of Patent: Oct. 17, 2000

[54] METHOD OF DELIVERING INFORMATION OVER A COMMUNICATION NETWORK

[76] Inventor: Frank J. Montero, 5980 Westgate Dr. Suite 203, Orlando, Fla. 32835

[21] Appl. No.: 09/071,874

[22] Filed: May 4, 1998

[51] Int. Cl.[7] .............................. G09G 5/00; G09G 5/40; G09G 5/14; H04N 9/74; H04N 5/445

[52] U.S. Cl. .............................. 345/327; 348/12; 348/13; 348/558; 348/559

[58] Field of Search .................................. 345/327, 113, 345/114, 115, 116, 118, 119, 120; 348/588, 589, 584, 564, 565, 566, 567, 568, 461, 465, 468, 12, 13, 10, 6; G09G 5/00, 5/40, 5/14; H04N 9/74, 5/445

[56] References Cited

U.S. PATENT DOCUMENTS

| | | |
|---|---|---|
| 4,070,695 | 1/1978 | Scholz et al. . |
| 4,766,581 | 8/1988 | Korn et al. .................................. 348/8 |
| 4,879,603 | 11/1989 | Berman .................................. 348/588 |
| 5,109,279 | 4/1992 | Ando . |
| 5,220,501 | 6/1993 | Lawlor et al. . |
| 5,233,423 | 8/1993 | Jernigan et al. . |
| 5,260,778 | 11/1993 | Kauffman et al. . |
| 5,446,919 | 8/1995 | Wilkins . |
| 5,495,283 | 2/1996 | Cowe . |
| 5,515,098 | 5/1996 | Carles . |
| 5,546,191 | 8/1996 | Hibi et al. .................................. 348/564 |
| 5,589,892 | 12/1996 | Knee et al. .................................. 348/731 |
| 5,594,910 | 1/1997 | Filepp et al. . |
| 5,600,364 | 2/1997 | Hendricks et al. .................................. 348/12 |
| 5,604,542 | 2/1997 | Dedrick . |
| 5,612,730 | 3/1997 | Lewis . |
| 5,614,927 | 3/1997 | Gifford et al. . |
| 5,615,338 | 3/1997 | Poole et al. . |
| 5,621,728 | 4/1997 | Lightfoot et al. . |
| 5,635,978 | 6/1997 | Alten et al. .................................. 347/7 |
| 5,636,346 | 6/1997 | Saxe . |
| 5,638,426 | 6/1997 | Lewis . |
| 5,644,723 | 7/1997 | Deaton et al. . |
| 5,649,114 | 7/1997 | Deaton et al. . |
| 5,652,615 | 7/1997 | Bryant et al. . |
| 5,661,516 | 8/1997 | Carles . |
| 5,697,844 | 12/1997 | Von Kohorn .................................. 370/310 |
| 5,701,161 | 12/1997 | Williams et al. . |

FOREIGN PATENT DOCUMENTS

| | | |
|---|---|---|
| 598969 | 6/1994 | European Pat. Off. . |
| 662760 | 7/1995 | European Pat. Off. . |
| 713310 | 5/1996 | European Pat. Off. . |
| 713311 | 5/1996 | European Pat. Off. . |
| 732660 | 9/1996 | European Pat. Off. . |
| 745948 | 12/1996 | European Pat. Off. . |
| 749081 | 12/1996 | European Pat. Off. . |

OTHER PUBLICATIONS

Whit Andrew, "Planning for PUSH: How to seize control of technology that's sweeping the web", Internet World, May 1997, pp. 45–52.

Bill Bercik, "Marimba's Castanet Orchestrating the Software Tango", Internet World, May 1997, pp. 46–52.

*Primary Examiner*—Nathan Flynn
*Assistant Examiner*—Vivek Srivastava
*Attorney, Agent, or Firm*—Fulbright & Jaworski, LLP

[57] ABSTRACT

A technique and apparatus for delivering information to the subscribers (terminals) on a communication network. The information is simultaneously displayed without interfering with the reception and/or display of subscriber's selected data or program.

415 Claims, 6 Drawing Sheets

METHOD OF DELIVERING INFORMATION OVER A COMMUNICATION NETWORK

BACKGROUND OF THE INVENTION

This invention relates to delivering information to the subscribers on a communication network, more particularly to a technique for dynamically delivering information to each active subscriber on the network without interfering with the reception and display of their selected data or program from the network.

In a typical communication network in which advertisements or other information are delivered, such as a conventional cable television network, a local area network (LAN), a wide area network (WAN) and the internet, the delivery of advertisements interferes with the reception and/or display of subscribers' selected program or data.

In a conventional cable television network and a conventional on-demand video distribution system, the messages are incorporated into the transmission data stream representing the program selected by the subscriber. That is, the transmission and/or display of the selected program is interrupted for commercial breaks.

In the internet, the information is downloaded ("pushed") on to the subscriber's terminal such that the display of the pushed information interferes with the display of the subscriber's selected data. That is, the pushed information is placed on top of the data (e.g., frames or page of data from a web site) that is being currently displayed on the subscriber's terminal.

However, it is desirable to continuously display "pushed" information, messages or advertisements simultaneously with the subscriber's selected data or program wherein they do not interfere with each other and are simultaneously viewable by the subscriber.

Also, in a typical communication network, the information such as advertisements are delivered to many subscribers indiscriminately. This is disadvantageous for the subscribers because some subscribers are subjected to advertisements in which they have no interest. It is also disadvantageous to the advertisers because the advertisers must pay to deliver the advertisement to a large audience of subscribers including the subscribers they desire to reach and the subscribers who have no interest in their advertisement.

It is desirable to target information, such as messages, announcements, advertisements, etc., to subscribers who are more likely to be interested in such information and deliver that information to only those selected subscribers.

Techniques have been proposed heretofore for selective distribution of messages over communication networks, such as a conventional cable television network and a conventional on-demand video distribution system. In a conventional cable television network, an addressable controller communicates with a plurality of subscriber converters on the network. Each converter, i.e., set-top converter box, is assigned as a member of a primary message group and may also be assigned to one or more message subgroups. The messages are input to the addressable controller for subsequent transmission to a converter for display on a television receiver connected to that converter. The head end tags the text messages with distribution data defining at least one primary message group or message subgroup to receive the message. Various primary groups are used to segregate converters based on geographical area or distribution hub, and subgroups are used to segregate subscribers into groups of particular interest. The tagged text messages are transmitted over the conventional cable television network together with broadcast signals from network service providers on separate paths or channels. A particular converter determines whether it is authorized to receive the tagged text message. If it is determined that this particular converter is authorized to receive the tagged text message, the converter either immediately displays the tagged text message by blocking the display of the broadcast signals on the selected (tuned) channel or overlays alphanumeric characters and/or graphics on top of the program being displayed on the subscriber's television receiver.

In a conventional on-demand video distribution system, a technique has been proposed in which commercial messages to be distributed over the network contain embedded information identifying categories of recipients for each message. A server, centrally located on the network, selectively tags commercial messages with the converter addresses of subscribers, satisfying the identifying categories. The commercial messages are inserted into the video signal associated with the video program selected by a particular addressed converter (subscriber) and transmitted over the network for receipt and display by a television receiver connected to that addressed converter. The addressed converters receive and display the commercials on their corresponding television receiver during scheduled commercial breaks in the program. The addresses are selected by the server based on information stored in a database related to demographic and other information relating to the household of the subscriber in comparison to the same information relating to households which are actual customers of the product or service which is a subject of the commercial.

However, it is desirable to continuously display the text messages or commercials along with the program on the subscriber's television receiver. The present invention proceeds upon the desirability of continuously displaying the messages simultaneously with the broadcast program in which the broadcast program and the messages do not interfere with each other and are simultaneously viewable by the subscriber.

Also, it is desirable to update the demographic information based on viewing habits, purchasing behavior and the like because the demographic information may become stale over time.

A customized information file is dynamically generated for each active subscribers on the network in accordance with the corresponding subscriber profile data stored in a database. Each customized information file containing a plurality of addresses of the information, e.g., messages, announcements, advertisements, etc., are sent to the corresponding subscriber.

Each active subscriber terminal sequentially displays the information located in the addresses found in its customized information list.

OBJECTS OF THE INVENTION

Therefore, it is an object of the present invention to provide an apparatus and technique for delivering information to subscribers on a communication network such that the information and the subscriber's selected data is simultaneously viewable by the subscriber.

Another object of this invention is to provide an apparatus and technique as aforesaid, which additionally displays the information without interfering with the reception and display of the subscriber's selected data.

Additional object of the present invention is to provide a technique for targeting information to subscribers who are more likely to be interested in a particular information and delivering that information to only those targeted (selected) subscribers.

Various other objects, advantages and features of the present invention will become readily apparent from the ensuing detailed description, and the novel features will be particularly pointed out in the appended claims.

SUMMARY OF THE INVENTION

In accordance with this invention, a processing device connected to a communication network continuously displays a sequence of information received from a plurality of INFO sources simultaneously with data selected from at least one data provider on the network such that the sequence of information and the selected data are simultaneously viewable by the subscriber. Although the subscriber may select data from on or more data providers, the subscriber cannot control the display of the sequence of information.

In a preferred embodiment, the sequence of information is continuously displayed without interfering with the display of the selected data.

In accordance with yet another aspect of this invention, a sequence of information is uniquely generated for each subscriber in accordance with the subscriber's profile data. A processing device associated with the subscriber continuously displays the sequence of information simultaneously with data selected from at least one data provider on the network such that the sequence of information and the selected data are simultaneously viewable by the subscriber. Although the subscriber may select data from on or more data providers, the subscriber cannot control the display of the sequence of information.

Preferably, the sequence of information is continuously displayed in one portion of the monitor associated with the processing device and the selected data is displayed in another portion of the monitor.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF PREFERRED EMBODIMENTS

The present invention is readily implemented by presently available communication apparatus and electronic components. The invention finds ready application in virtually all commercial communication networks, including but not limited to over-the-air broadcasts, local area network (LAN), wide area network (WAN), intranet, world wide web (internet), wired cable transmission systems and direct satellite broadcast systems.

Figure 1:
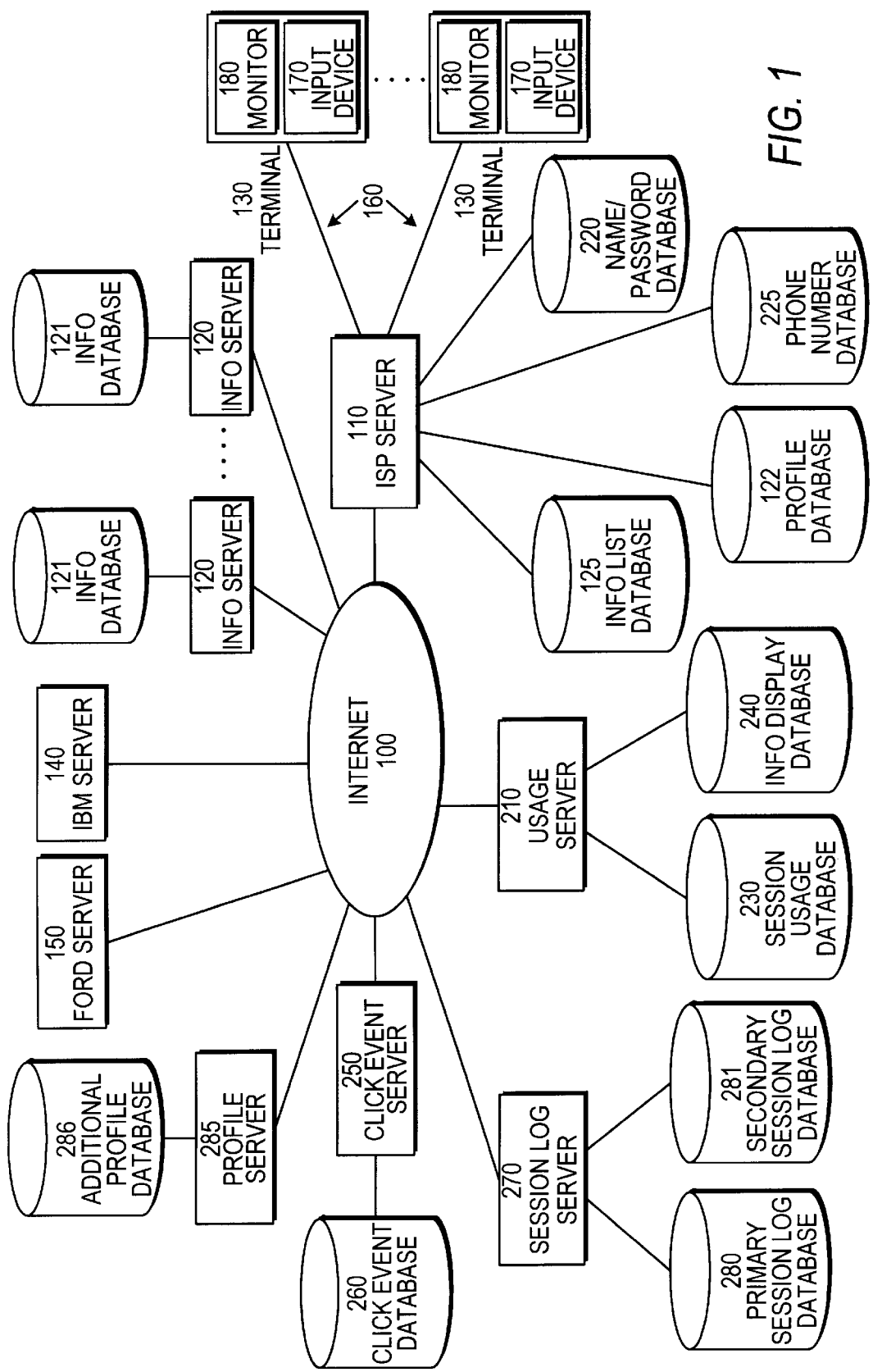
FIG. 1 is a block diagram showing the incorporation of the present invention in a world wide web (internet)

Turning now to FIG. 1, there is illustrated a block diagram of a computer network, specifically internet (world wide web), which incorporates the present invention. An internet service provider (ISP) server 110, INFO servers 120, INFO databases 121, a profile database 122, subscriber terminals 130, data providers, such as an IBM server 140 and a FORD server 150, a session usage server 210, a name/password database 220, a session usage database 230, an INFO display database 240, a clicked event server 250, a clicked event database 260, a session log server 270, a primary session log database 280, a profile server 285 and an additional profile database 286 are connected to each other to form an internet 100. It is appreciated that the internet contemplated in the present invention is not limited to the internet shown in FIG. 1. FIG. 1 is merely a simplified representation of the internet and it is appreciated that a numerous number of servers may be connected to form the internet.

The individual subscriber terminal 130 includes a monitor 180 and an input device 170 such as keyboard, mouse or like. Although not described in detail, it will be appreciated that the terminal may be a conventional computer, such as an ibm-compatible personal computer (PC), a network computer, an Apple Macintosh computer or like.

The profile data representing the demographic of the subscriber is stored in the profile database 122. The profile data may comprise home address, business address, length of residence, household income, gender, age group, the frequency of internet or cable use, but is not limited to such. It is appreciated that the profile data may be supplied via a telephone to a representative of the internet service provider, entered on the input device 170 of the subscriber terminal 130, obtained from a questionnaire profile form completed by the subscriber or by other comparable means. If the profile data is entered on the input device 170 by the subscriber, the subscriber terminal 130 transmits the profile data to the ISP server 110. The profile data may be encrypted and compressed before it is transmitted to the ISP server 110.

The ISP server 110 forwards and stores the received profile data in the profile database 122. The ISP server 110 may also decrypt and decompress the received profile data before storing the profile data in the profile database 122. Also, from time to time, additional demographic information may be requested from the subscribers and this additional demographic information may be stored with the profile data in the profile database 122 or separately in the additional profile database 286.

If the additional profile data is entered on the input device 170 by the subscriber, the subscriber terminal 130 transmits the additional profile data to the ISP server 110. The additional profile data may be encrypted and compressed before it is transmitted to the ISP server 110. The ISP server 110 forwards and stores the received additional profile data in the additional profile database 286 or the profile database 122. Alternatively, the ISP server 110 may forward the additional profile data to the profile server 285 which decrypts and decompresses the received additional profile data, and stores the additional profile data in the additional profile database 286.

The INFO servers 120 continuously transmit information, such as advertisements, news, messages, web pages, data packets, stock tickers, announcements, updates and like, to form a sequence of information. It is appreciated that the information may comprise but is not limited to texts, still pictures, moving pictures, video and audio components, or a combination thereof. This sequence of information is supplied to the ISP server 110 for distribution to the subscribers. It is appreciated that the one or more INFO servers may represent web channels, e.g., travel channel, weather channel, etc. In such a case, the INFO servers 120 continuously transmit information relating to travel or weather. It is also appreciated that each INFO server 120 may include an INFO database 121 wherein the information for distribution is stored. In such a case, each INFO server 120 retrieves the information from its respective INFO database 121 and transmits the retrieved information to the subscribers on the network.

Alternatively, the sequence of information is selected for each subscriber in accordance with the subscriber's profile data which may also include the additional profile data. That is, a sequence of information is dynamically and individually generated for each subscriber. For example, if an advertiser chooses to target its advertisements to males under 40 years of age with annual incomes exceeding $50,000, then these advertisements could be distributed to only those subscribers satisfying these demographic requirements. It is appreciated that a part or all of the subscriber's profile data containing various demographic information may be used to generate the sequence of information.

Preferably, the ISP server 110 may retrieve a sequence of INFO IDs or a sequence of INFO addresses from an INFO list database 125 for distribution to the subscribers. The sequence of INFO IDs may contain a list of INFO IDs uniquely identifying each information in the sequence of information; INFO durations representing the length of time each information is to be displayed to the subscribers, e.g., display the information for 30 seconds; and display time ranges representing the time of the day that each information is to be displayed to the subscribers, e.g., display the information within 7:00 PM to 8:00 PM. Additionally, the sequence of INFO addresses may contain a list of addresses indicating the location of each information in the INFO servers 120, INFO durations, display time ranges. The ISP server 110 transmits the sequence of INFO IDs or addresses to the subscriber terminals 130 which stores the received sequence in a local storage device (not shown).

In accordance with a preferred embodiment of the present invention, the ISP server 110 may generate a customized and individualized sequence of INFO IDs or addresses for each subscriber in accordance with the subscriber's profile data which may also include the additional profile data. That is, a sequence of INFO IDs or addresses is dynamically and individually generated for each subscriber. It is appreciated that this sequence of INFO IDs or addresses may be pre-generated for each subscriber during off-peak hours and provided to the subscriber's terminal 130 when it connects to the ISP server 110 or dynamically generated for each subscriber when the subscriber's terminal successfully connects to the ISP server 110. This customized sequence of INFO IDs or addresses is then transmitted to the subscriber terminal 130 associated with that subscriber and to the session usage server 210 which stores the received sequence for that subscriber in the session usage database 230.

The individual subscriber terminals or processing devices 130 then reads the information located in these addresses or corresponding to the INFO IDs and displays the read information as the sequence of information for the INFO duration specified during the display time ranges. In other words, these addresses may represent URLs (uniform resource locators) or the like and the subscriber terminal 130 reads the web pages from the INFO servers 120 corresponding to these URLs and displays them as the sequence of information from 7:00 PM to 8:00 PM. For example, if a particular information has INFO duration of 30 seconds, then each time this particular information is displayed during the display time period (range), the information is displayed for 30 seconds.

Also, the profile data may contain information relating to the subscriber's time zone which can be used to generate the sequence of information. For example, if a particular information has a display time range of 6:00 PM to 7:00 PM and the current time is 9:00 PM EST (Eastern Standard Time), then this information would not be provided to any U.S. subscribers in the EST time zone, but would be supplied to U.S. subscribers in the Pacific time zone.

Individual subscriber terminals 130, i.e., authorized subscribers to the ISP, are connected to the ISP server 110 by telephone lines 160, which can be constructed as ordinary telephone lines, ISDN lines, or T1 lines. It is appreciated that the subscriber terminals 130 may be connected to the ISP server 110 by cables, which can be constructed as either coaxial cables, optical fiber cables, or a combination thereof. Also, it is appreciated that the connection between the ISP server 110 and each subscriber terminal 130 may be a wireless connection.

It is noted that only authorized subscribers, i.e., authorized subscriber terminals 130, are permitted to be connected to the ISP server 110 and unauthorized subscriber terminals are inhibited from displaying the sequence of information received from the INFO servers 120. Each subscriber is assigned a unique subscriber ID and a password, which are stored in the name/password database 220 or like accessible by the ISP server 110. Alternatively, each subscriber terminal 130 may be assigned a unique subscriber ID and a password.

The subscriber enters a subscriber ID and a password on the input device 170 to initiate a connection between the subscriber terminal 130 and the ISP server 110. The subscriber terminal 130 transmits the subscriber ID and the password to the ISP server 110 which forwards them to the name/password database 220 for verification. Preferably, the subscriber ID and the password is compressed and encrypted using standard compression and encryption techniques before it is transmitted to the ISP server 110. The name/password database 220 decrypts and decompresses the compressed and encrypted subscriber ID and the password before they are stored.

The name/password database 220 first determines whether the received subscriber ID matches one of the stored subscriber IDs. If a match is found for the subscriber ID, then the name/password database 220 further determines whether received password matches the stored password associated with that subscriber ID. If match is also found for the password, then the subscriber is determined to be an authorized subscriber, and the connection between the subscriber terminal 130 and the ISP server 110 is established. Additionally, the subscriber terminal 130 is categorized as an authorized subscriber terminal and login information for that authorized subscriber is generated and stored in the session usage database 230 or like. It is appreciated that subscriber terminal 130 may store the login information in a local storage device (not shown) before transmitting the login information to the session usage database. The login information may comprise a login time and a login date, but is not limited to such information. For example, the login information may additionally contain a location ID, information relating to the locality of that subscriber terminal

130. It is appreciated that the location ID may represent a zip code, a telephone number, a country name or code, a state or province name, or like. Alternatively, the login information may be transmitted to the session usage server 210 which generates a session usage record from the login information and stores the session usage record in the session usage database 230. It is appreciated that the session usage record may not necessarily contain all the login information.

Also, it is appreciated that the login time and the login date may be generated in accordance with a network system clock, thereby ensuring accurate and uniform login information from the subscriber terminals 130. The network system clock may reside in the ISP server 110 or some other server on the internet 100. Accordingly, the clock information of each subscriber terminal is not overwritten with the network system clock information, but each subscriber terminal time stamps the information to be transmitted to the ISP server 110 based on the network system clock. That is, each subscriber terminal 130 has a real time and a virtual time based on the network system clock, and generates a virtual login time and a virtual login date based on the network system clock.

However, if no match is found for the subscriber ID or the password, then the subscriber is determined to be an unauthorized subscriber, and the connection is not established between the subscriber terminal 130 and the ISP server 110. Additionally, the subscriber terminal 130 is categorized as an unauthorized subscriber terminal.

In accordance with the preferred embodiment, the subscriber also selects an access phone number using the input device 170 to initiate a connection between the subscriber terminal 130 and the ISP server 110 using that access phone number. It is contemplated that a phone database 225 connected to the internet 100 contains all of the access phone numbers that can be used to connect to the ISP server 110 along with the zip codes and time zones that are associated with each access phone number. Additionally, a pre-assigned zip code is stored for each access phone number in the phone database 225.

Once the connection has been successfully established between the subscriber terminal 130 and the ISP server 110 using the selected access phone number, the ISP server 110 requests zip code information of the subscriber terminal 130 from the name/password database 220. The received zip code is forwarded to the phone database 225 to determine whether the received zip code is associated with the entered access phone number. If it is determined that the received zip code is associated with the selected access phone number, then the subscriber is presumed to be logging in from his/her home and the received zip code is used as a location zip code. However, if it is determined that the received zip code is not associated with the selected access phone number, then the subscriber is presumed to be logging in from a remote location and the pre-assigned zip code associated with the selected access phone number is used as the location zip code.

It is appreciated that the access phone number and the location zip code of the subscriber, and the time zone corresponding to the location zip code of the subscriber can also be used to generate the sequence of information for that subscriber. For example, if a particular information has a display time range of 6:00 PM to 8:00 PM and the current time is 9:00 PM EST (Eastern Standard Time), then this information would not be provided to any U.S. subscribers in the EST time zone, but would be supplied to U.S. subscribers in the Mountain and Pacific time zones. This will advantageously permit the advertisers to target their advertisements based on the geographic location of the subscriber to consider regional preferences. That is, advertisers may want to use one advertisement for people in the east coast and another advertisement for people in the west coast.

The authorized subscriber enters an URL on the input device 170 to request a web page from the host server (or data provider) on the internet 100. It is appreciated that each host server on the internet is uniquely identified by a host server name which is referred hereinafter as a data provider ID. For example, to request a web page from the IBM server 140 on the internet 100, the authorized subscriber enters the following URL, "http://www.ibm.com", on the input device 170. The subscriber terminal 130 supplies the requested URL to the ISP server 110. It is appreciated that the requested URLs received from the unauthorized subscriber terminals are rejected by the ISP server 110 and not forwarded to the host server. This effectively inhibits the unauthorized subscriber terminals from displaying the web page from the host server.

The ISP server 110 retransmits the request for a web page from the authorized subscriber terminals 130 to the IBM server 140 via the internet 100. In response to the request, the IBM server 140 supplies the requested web page to the ISP server 110. The ISP server 110 then retransmits the web page to the appropriate subscriber terminal 130.

The subscriber terminal 130 continuously displays on the monitor 180 the sequence of information simultaneously with the requested web page received from the IBM server 140 via the ISP server 110. It is contemplated that the sequence of information and the requested web page are displayed on the monitor 180 such that they are simultaneously viewable by the subscriber.

Figure 2:
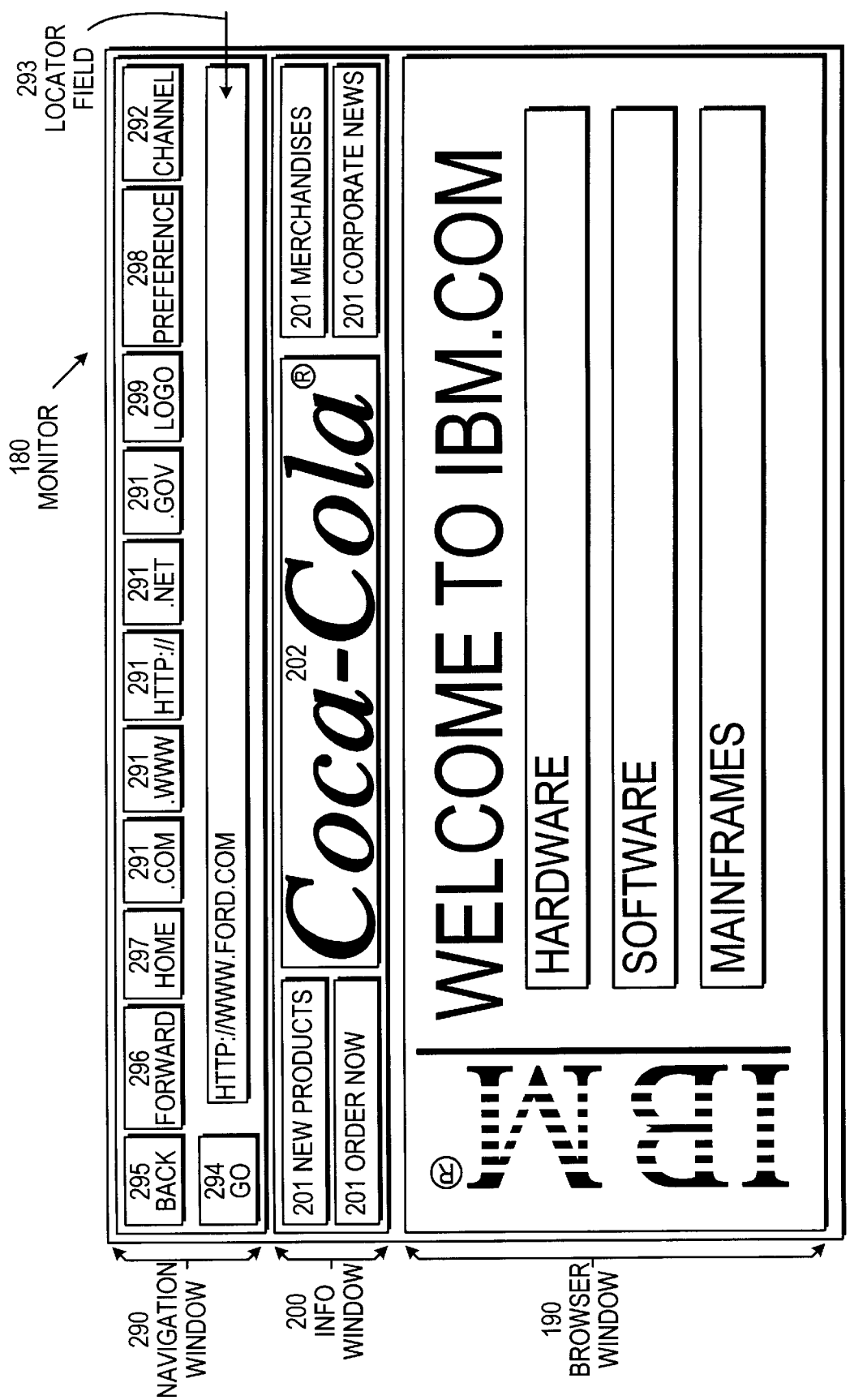
FIG. 2 is a block diagram representing an embodiment of a terminal of FIG. 1 depicting the three portions of the monitor.

Preferably, the display of the sequence of information on the monitor 180 does not interfere with the display of the requested web page. In such a scheme, the sequence of information may be displayed in a first portion of the monitor 180 and the requested web page in a second portion of the monitor 180. For simplicity, the two portions of the monitor 180 will be referred hereinafter as a browser window 190 and an INFO window 200 as depicted in FIG. 2. Accordingly, the sequence of information is displayed in the INFO window 200 and the requested web page is displayed in the browser window 190. It is appreciated that each information in the sequence is displayed on the INFO window 200 for the assigned INFO duration, e.g., first information may be displayed for 30 seconds, second information for 15 seconds, etc.

Alternatively, the monitor 180 may be divided into three portions, namely the browser window 190, the INFO window 200 and a navigation window 290. The navigation window may include clickable buttons 291, channel button 292 to select preferred channels, locator field 293, a GO button 294, a back button 295 to move to previous web page, a forward button 296 to move to the next web page, a home button 297 to retrieve the subscriber's selected home page, a preference button 298 to enter, modify and update the subscriber's profile data and a logo button 299 to connect a pre-assigned web page. It is appreciated that more buttons providing different functions and features may be incorporated into the navigation window 290.

The subscriber may use the preference button 298 to select the preferred system attributes such as the preferred home page, the display settings, the modem settings, the memory allocation or the like. Also, the preference button 298 may be used to modify passwords, access phone numbers or the like.

The URL entered by the authorized subscriber on the input device 170 to request a web page from the host server appears on the locator field 293. Instead of entering the complete URL, the user may instead enter an incomplete URL by simply entering the host name of the desired host server with or without the name of the domain, and press the GO button 294. The present invention contextually determines the remaining (or missing) components of the incomplete URL to form a complete URL. That is, if the subscriber enters "ibm.com," the subscriber terminal 130 contextually determines the complete URL as "http://www.ibm.com" and supplies the complete URL to the ISP server 110.

However, if the subscriber simply enters "ibm," then the subscriber terminal 130 first determines the appropriate domain of the host server "ibm" and then contextually determines the complete URL. It is noted that currently the following domains exist in the internet for the United States: com, gov, edu, org, and net. For other countries, these domains are followed by country code, such as org.kr for Korea and org.de for Germany. It is also noted that the host servers are distributed between these various domains, thus the subscriber terminal 130 determines the appropriate domain based on the probability distribution of the host servers in a particular domain. That is, the subscriber terminal 130 determines the probability of finding the entered host server in these various domains and then selects the one with the highest probability. If it is determined that the host server does not reside in the selected domain, the subscriber terminal 130 selects another domain having the next highest probability until the domain is found for the entered host server.

Each of the clickable buttons 291 corresponds to one component of the URL, such as "http://", "www.", ".com", ".net" and the like as shown in FIG. 2. Instead of simply entering the host name, the subscriber may enter the host name and click one or more clickable buttons 291 for the missing components of the URL, and the subscriber terminal 130 contextually determines the appropriate URL. For example, if the subscriber enters "ibm" and clicks the "http://" button, the subscriber terminal 130 contextually determines the complete URL as "http://www.ibm.com" for the IBM web site. If the subscriber clicks the ".gov" button and enters "irs", the subscriber terminal 130 contextually determines the complete URL as "http://www.irs.gov" for the IRS web site. It is appreciated that the components of the URL need not be entered in its proper sequential order. Regardless of the order the URL components are entered, the present invention contextually determines the complete URL in its proper sequential order.

Also, the INFO window 200 may include unlinked regions 202 and linked regions 201 such as "Corporate News", "Merchandise", "New Products" or "Order Now" as shown in FIG. 2. Each of the linked regions 201 may be linked to a host server (a data provider) on the internet 100. The subscriber may click one of the linked regions 201 to receive additional information relating to corporate news, merchandise, new products or to place an order. For example, if the subscriber clicks the linked region 201 labeled "Corporate News" in FIG. 2, the subscriber terminal 130 will be connected to the Coca-Cola corporate news web page containing corporate news information which will be displayed on the browser window 190. Alternatively, if the subscriber clicks the linked region 201 labeled "Corporate News," the subscriber may receive this additional information via e-mail, fax, mail or like. Preferably, the additional information displayed in the browser window 190 may depend on the subscriber's profile data. For example, if the subscriber checks on the linked region 201 labeled "New Products" to receive additional information on the latest golf gloves, the subscriber terminal 130 may request the subscriber's profile data from the profile database 122 to determine whether the subscriber is left-handed or right-handed. If it is determined that the subscriber is left-handed then only golf-gloves for left-handed people are displayed in the browser window 190. It is appreciated that the linked regions 201 are not limited to those depicted in FIG. 2 and other linked regions are contemplated in the present invention.

Figure 3:
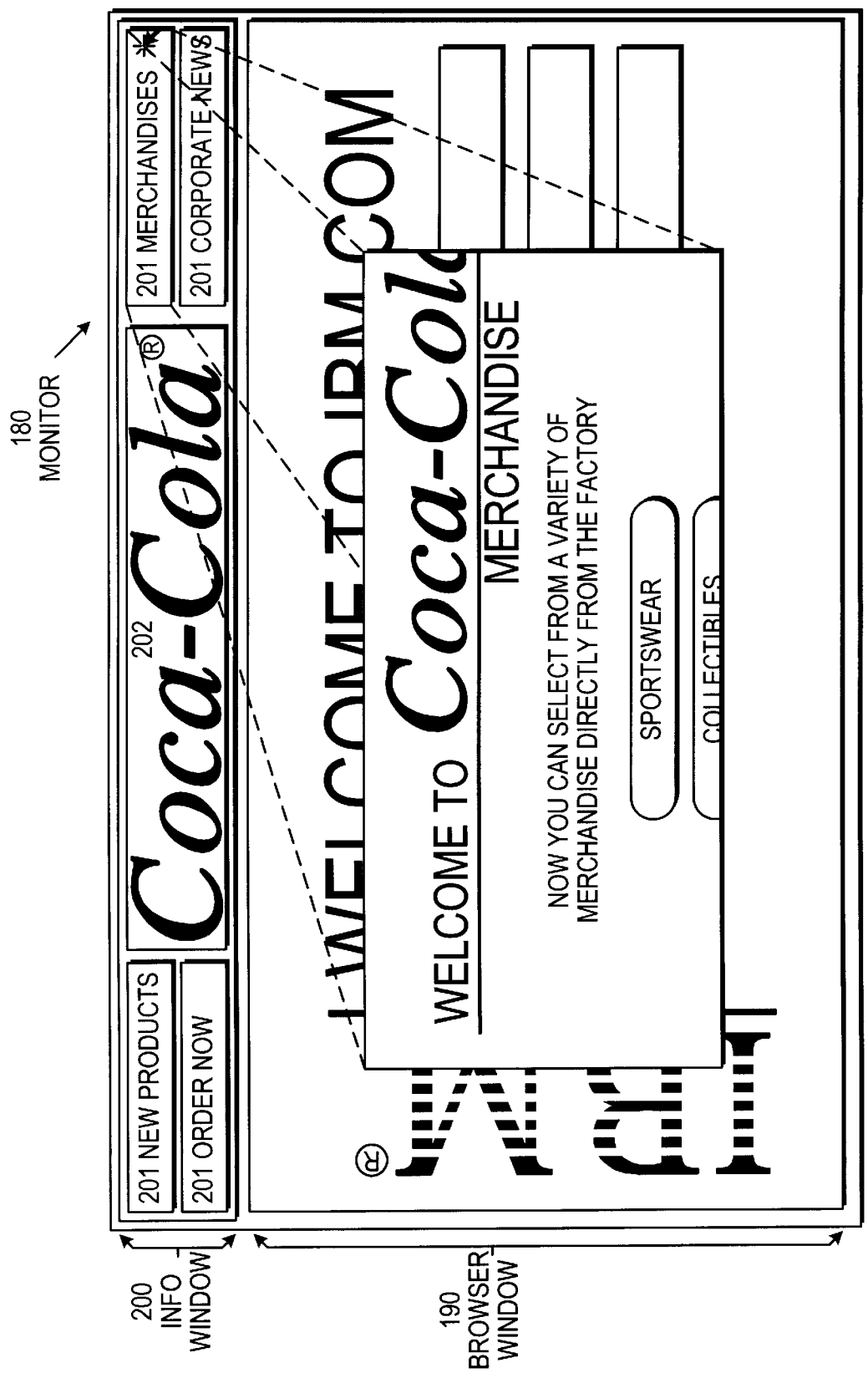
FIG. 3 is a block diagram representing an embodiment of an INFO window and a browser window of FIG. 2.

As illustrated in FIG. 3, if the subscriber clicks one of the linked regions 201 of the INFO window 200, a pop-up window, a pull-down menu or like may appear in the browser window wherein the subscriber may be requested to complete a questionnaire form or provide requested data to receive the additional information. For example, the subscriber may be requested to provide an e-mail address, street address, fax number or the like to receive additional information. It is appreciated that the subscriber may provide another person's e-mail address so that the other person may receive the additional information via e-mail. Also, it is appreciated that the requested data may be retrieved from the profile database 122 and displayed in the browser window 190. The subscriber may accept (confirm) this retrieved data or modify the data so as to provide the additional information to another person. After the requested data is either entered or selected by the subscriber, the subscriber terminal 130 transmits the requested data or completed questionnaire form to the ISP server 110.

Preferably, the ISP server 110 transmits the completed questionnaire form or the requested data to the profile server 285 to store or update the subscriber's additional profile information in the additional profile database 286. Alternatively, the ISP server 110 retrieves the profile data associated with the subscriber from the profile database 122 and transmits the completed questionnaire form along with the subscriber ID and the subscriber's profile data to the profile server 285. The profile server 285 then stores or updates the subscriber's additional profile information in the additional profile database 286. It is appreciated that this advantageously permits the present invention to provide a mechanism for interactive communication between the subscriber and the INFO provider. Also, other means of providing the requested data are contemplated such as a radio button for exclusive selections, check boxes for multiple selections and like.

It is appreciated that although the subscriber cannot control the display of the sequence of information on the INFO window 200 of the monitor 180, the subscriber can select another web page to be displayed on the browser window 190 by entering another URL such as "http://www.ford.com" on the input device 170. The display of the web page from the IBM server 140 on the browser window 190 is replaced with the web page from the FORD server 150. That is, the requested web page received from the FORD server 150 is now displayed in the browser window 190 without affecting the display of the INFO window 200.

Alternatively, the contents of the INFO window 200, each information in the sequence of information, can be characterized as an unsolicited request for a web page (data) from one of the host servers, such as the IBM server 140. In other words, the materials displayed on the browser window 190 represent solicited web pages requested by the subscriber, whereas the materials displayed on the INFO window 200 represent unsolicited web pages not requested by the subscriber. Essentially, without informing the subscriber, the subscriber terminal 130 automatically transmits an URL to request a web page to be displayed on the INFO window 200 from a host server.

Preferably, the host servers may be divided into two groups, wherein each group of servers accepts only one type of requests. That is, the first group of servers may accept only solicited request for web pages and the second group accepts only unsolicited request for web pages. Any solicited request for web pages from the second group of servers is denied and the browser window 190 may display a message such as "requested URL unavailable".

When the connection between the subscriber terminal 130 and the ISP server 110 is determined to be terminated, the ISP server 110 generates logout information and stores the information in the session usage database 230. It is appreciated that the subscriber terminal may store the logout information in the local storage device (not shown) before transmitting the logout information to the session usage database 230. The logout information may comprise a logout time and a logout date, but is not limited to such information. Alternatively, each subscriber terminal 130 may generate the logout information if the connection between the subscriber terminal 130 and the ISP server 110 is terminated by the subscriber. It is appreciated that each subscriber terminal 130 may generate the logout time and the logout date using the virtual clock rather than its internal clock to ensure accurate and uniform logout information.

Alternatively, the ISP server 110 transmits the logout information to the session usage server 210. The session usage server 210 generates session duration information as a function of the subscriber's stored login date, the subscriber's stored login time, the received logout date and the received logout time. The session usage server 210 updates the session usage record of the subscriber in response to the received logout date, the received logout time and the session duration information, and stores the updated session usage record in the session usage database 230. The updated session usage record of the subscriber may be used along with the subscriber's profile data to select the sequence of information for the subscriber. That is, the data generated from the current session for the subscriber may be used to generate the sequence of information for the next session. It is noted that the current session implies the subscriber's current connection to the ISP server 110.

It is appreciated that the subscriber terminal 130 may be disconnected from the ISP server 110 due to faulty connection, hardware and software problems, power outage, etc. Preferably, to account for such disconnections, each subscriber terminal 130 generates a ping signal every predetermined interval, e.g., every 5, 10 or 15 minutes, and transmits the ping signal to the ISP server 110. It is appreciated that the ping signal may include information identifying the source of the ping signal, such as the subscriber ID.

The ISP server 110 forwards the ping signal to the session usage database 230. It is contemplated that the session usage database 230 stores information relating to the expected time of the next ping signal for each subscriber. When a subscriber terminal 130 successfully connects to the ISP server 110, the session usage database 230 sets the expected time of the next ping signal for that subscriber to the current time plus a multiple number of the predetermined ping signal interval. That is, upon the receipt of login information from a subscriber terminal 130, the session usage database 230 sets the expected time of the next ping signal for that subscriber.

If a ping signal is received substantially within the expected time from a subscriber terminal 130, then the session usage database 230 updates the expected time of the next ping signal for that subscriber. Preferably, the ISP server 110 may transmit the ping signal to the session usage server 210 which forwards the ping signal to the session usage database 230 for processing and storage. However, if a ping signal is not received substantially within the expected time from that subscriber terminal 130, then the connection between that subscriber terminal 130 and the ISP server 110 is presumed to be terminated. Preferably, the session usage server 210 transmits a disconnect signal to the ISP server 110 to disconnect that subscriber terminal 130 from the ISP server 110. The session usage server 210 also generates and transmits the logout information for that subscriber to the session usage database 230 for storage. It is appreciated that the disconnect signal and logout information may be generated by the ISP server 110 and transmitted to the session database 230 for storage.

It is appreciated that for transmission efficiency and security the ping signal may be encrypted and compressed using standard encryption and compression techniques before it is transmitted to the ISP server 110. In such a scenario, the session usage server 210 decrypts and decompresses the ping signal before updating the expected time of the next ping signal.

Since the information displayed to the subscribers may represent advertisements, it may be important to keep track of what advertisements were transmitted and displayed to the subscribers. This information may be used to directly determine the number of people who viewed a particular advertisement. It is appreciated that this is comparable to Nielsen's or Arbitron's rating scheme for television and radio, except that the present technique provides a more precise and detailed measurement of the viewing habits of the subscribers. That is, the present technique advantageously permits a more accurate demographic profile to be developed for each subscriber, thereby enabling the advertisers to selectively target their advertisements with greater precision.

Accordingly, for each subscriber, the present invention determines which information in the sequence of information was displayed to that subscriber based on the INFO durations and the subscriber's session usage record stored in the session usage database 230. Specifically, the subscriber's stored session duration information or the subscriber's stored login time, stored login date, stored logout time and stored logout date of the subscriber's session usage record may be used to determine which information was displayed on the subscriber terminal 130. The result of this determination may be compiled as a list to provide a list of displayed information. This list of displayed information is then stored in an INFO display database 240 or the like. It is appreciated that this list of displayed information for each subscriber may be a list of INFO IDs and INFO durations corresponding to the information that was displayed to that subscriber.

The list of displayed information for each subscriber may additionally contain the subscriber ID and information relating to the display date and display time that a particular information in that list of displayed information was displayed to that subscriber. It is appreciated that the display date and the display time information may be derived from the INFO durations and the subscriber's session usage record stored in the session usage database 230, namely from subscriber's login time, login date, logout time and logout date.

The list of displayed information for each subscriber may further contain information relating to the locality of that subscriber terminal 130, namely the location ID. Alternatively, the list of displayed information for each subscriber may be transmitted to the session usage server 210 which generates an INFO display record for each INFO ID in that list of displayed information and stores the INFO display record in the INFO display database 240. It is appreciated that the session usage server 210 may not necessarily use all of the information contained in the list of displayed information to generate the INFO display record. Also, the INFO display record of the subscriber may be used along with the subscriber's profile data to select the sequence of information for the subscriber. That is, the information displayed to the subscriber in his/her current session may be used to generate the sequence of information for the next session.

In addition, for each displayed information, the present invention keeps track of all of the linked regions 201 selected (or clicked) by each subscriber during the display of that information to provide a linked region ID. This information may be used to determine the subscriber's interest in a particular product, company, channel or like, providing a more accurate information on the viewing habits of the subscriber. Also, this information may be used to develop a targeted advertising strategy, where the advertisers can determine the subscribers who are more likely to be interested in receiving such information. It is appreciated that since each linked region 201 is connected to a particular host server, each linked region ID may represent a selected host server ID (or a selected data provider ID).

If it is determined that at least one linked region 201 has been selected by a subscriber, the subscriber terminal 130 associated with that subscriber generates and transmits a clicked event report packet to the ISP server 110. It is appreciated that the subscriber terminal 130 may store the clicked event report packet in the local storage device (not shown) before transmitting the clicked event report packet to the ISP server 110. The clicked event report packet may contain the subscriber ID of the subscriber terminal 130, the displayed INFO ID of the displayed information, the selected data provider ID corresponding to the clicked linked region 201, the date and time the information was displayed on the subscriber terminal 130 to provide the display date and the display time of the displayed information, and the location ID defining the locality of the subscriber terminal 130. It is appreciated that the subscriber terminal 130 may generate the display date and display time using the virtual clock rather than its internal clock to ensure accurate and uniform information. Also, it is appreciated that the clicked event report packet may be encrypted and compressed before it is transmitted to the ISP server 110 for transmission efficiency and security purposes.

The ISP server 110 forwards and stores the received clicked event report packet in the clicked event database 260. Alternatively, the ISP server 110 may forward the clicked event report packet to the clicked event server 250 which decrypts and decompresses the received clicked event report packet, and generates a clicked event record. The clicked event record is then stored in the clicked event database 260. It is appreciated that the clicked event server 250 may not necessarily use all of the information in the clicked event report packet to generate the clicked event record. Also, the clicked event record of the subscriber may be used along with the subscriber's profile data to select the sequence of information for the subscriber. That is, the information selected by the subscriber in his/her current session may be used to generate the sequence of information for the next session.

Further, it may be advantageous to keep track of the web sites (host servers) visited by the subscriber to develop a more precise profile on each subscriber. Thereby, enabling the advertisers to better select their target audience (subscribers) for their promotions, advertisements and like.

Accordingly, for each subscriber, the present invention determines all the host servers selected by that subscriber and stores the corresponding data provider IDs in the primary session log database 280. It is appreciated that each time a requested web page (data) is successfully retrieved from the host server and displayed on the browser window 190, the subscriber terminal 130 associated with that subscriber may generate and transmit a session log packet to the ISP server 110. It is appreciated that the subscriber terminal 130 may store the session log packet in the local storage device (not shown) before transmitting the session log packet to the ISP server 110. The session log packet may contain the subscriber ID of the subscriber terminal 130, the data provider ID of the host server selected by the subscriber, the date and time the requested web page was displayed on the subscriber terminal 130 to provide the display date and the display time of the requested web page, and the location ID defining the locality of the subscriber terminal 130. Also, it is appreciated that the subscriber terminal 130 may generate the display date and display time using the virtual clock rather than its internal clock to ensure accurate and uniform information. Further, it is appreciated that the session log packet may be encrypted and compressed before it is transmitted to the ISP server 110.

The ISP server 110 forwards and stores the received session log packet in the primary session log database 280. Alternatively, the ISP server 110 may forward the session log packet to the session log server 270 which decrypts and decompresses the received session log packet, and generates a primary data display record. The primary data display record is then stored in the primary session log database 280.

Also, the session log server 270 may retrieve the profile data from the profile database 122 using the subscriber ID and additionally generate a secondary data display record substituting the subscriber ID information in the primary data display record with the profile data information associated with that subscriber ID. The secondary data display record is then stored in the secondary session log database 281. That is, the session log server 270 may combine information from the different databases to generate a customized record. For example, a record may be created to provide viewing habits of subscribers belonging to a particular demographic group such as single female under 30 with annual income exceeding $100,000 living in Florida. It is appreciated that the session log server 270 may not necessarily use all of the information in the session log packet to generate the primary and secondary data display records.

Further, the data display record of the subscriber may be used along with the subscriber's profile data to select the sequence of information for the subscriber. That is, the web site visited by the subscriber in his/her current session may be used to generate the sequence of information for the next session.

Figure 4:
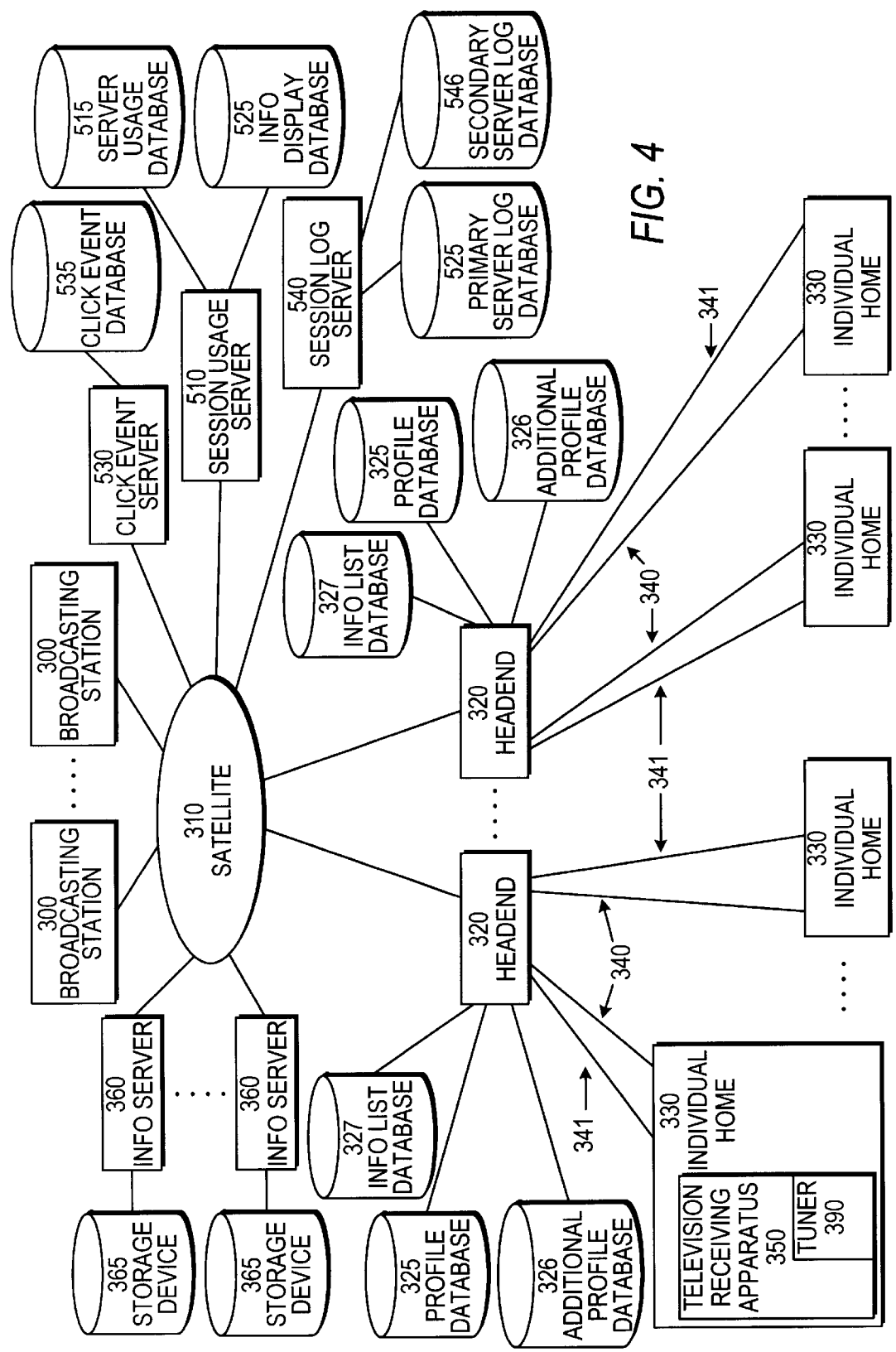
FIG. 4 is a block diagram showing the incorporation of the present invention in a cable television network.

Turning now to FIG. 4, there is illustrated a block diagram of a cable television network which incorporates the present invention. The apparatus illustrated in FIG. 4 may be included in a set-top converter, a television receiver, a video recorder or other conventional apparatus typically used to receive and cause the display of television pictures. A broadcasting station 300 transmits broadcasting signals to a satellite 310 (for example, a broadcasting or communication satellite). These broadcasting signals are retransmitted to head-ends 320 disposed in individual service areas, each of which may contain an antenna to receive the broadcasting signals, a receiving amplifier, an image source input portion (if necessary), a modulator to modulate the received broadcasting signals, and a multiplexer to multiplex the output of the modulator before it is output to a transmission line.

Individual homes 330, i.e., subscribers to the cable television system, are connected to a single head-end 320 by a cable 340, which can be constructed as either a coaxial cable, an optical fiber cable, or a combination thereof. For simplicity, the head-end 320 that a particular home 330 (or a particular television receiving apparatus 350) is connected to is referred to hereinafter as the associated head-end 320. The cable 340 is connected in a tree shape or in a star shape. It is appreciated that the individual homes 330 may be connected to head-end 320 via wireless connection, satellite connection or like. A subscriber of the cable television system (home 330) is provided with a processing device such as a television receiving apparatus 350, which contains a tuner 390 for permanently tuning to information channels broadcasting the sequence of information and selectively tuning to a desired broadcast channel. It is appreciated that the tuner 390 may comprise multiple tuners such that one tuner may be used to tune to the desired broadcast channel and other tuners may be used to tune to the information channels. The received broadcast signals which constitute the program received from the broadcasting station 300 are supplied to a monitor 370 (FIG. 5) whereat it is displayed to the viewer (i.e., members of subscriber's household). It will be appreciated that the monitor 370 includes the usual video processing circuitry normally provided in television receiving apparatus or high definition television (HDTV) to permit a television picture (and accompanying audio information) to be displayed to a viewer.

The cable television network according to the present invention is not limited to the cable television network shown in FIG. 4. For example, a plurality of program providers (i.e., data providers) can transmit programs and a plurality of INFO servers 360 can transmit information such as advertisements and like to the satellite 310. A cable television station may be interposed between the satellite 310 and the head-ends 320 to receive broadcasting signals from the satellite 310 and relay those signals to the head-ends by optical fiber cables. Each head end is connected to homes of authorized subscribers by optical fiber cables or coaxial cables. In addition, the present invention may be applied to a video image communication system such as a TV conference system, a satellite communication system or like.

The broadcasting signal generated in the head-end 320 contains a plurality of broadcast channels (i.e., data providers) which are encoded for example using motion compensated interframe prediction coding techniques. Highly efficient encoders are utilized in the head-end 320 (not shown) in accordance with the MPEG (Moving Picture Experts Group) or MPEG2 system that has been adopted by the ISO (international Organization for Standardization). The encoded broadcast signals may be time-division multiplexed into a packet, which is digitally modulated, for example, using a PSK modulation technique.

Figure 5:
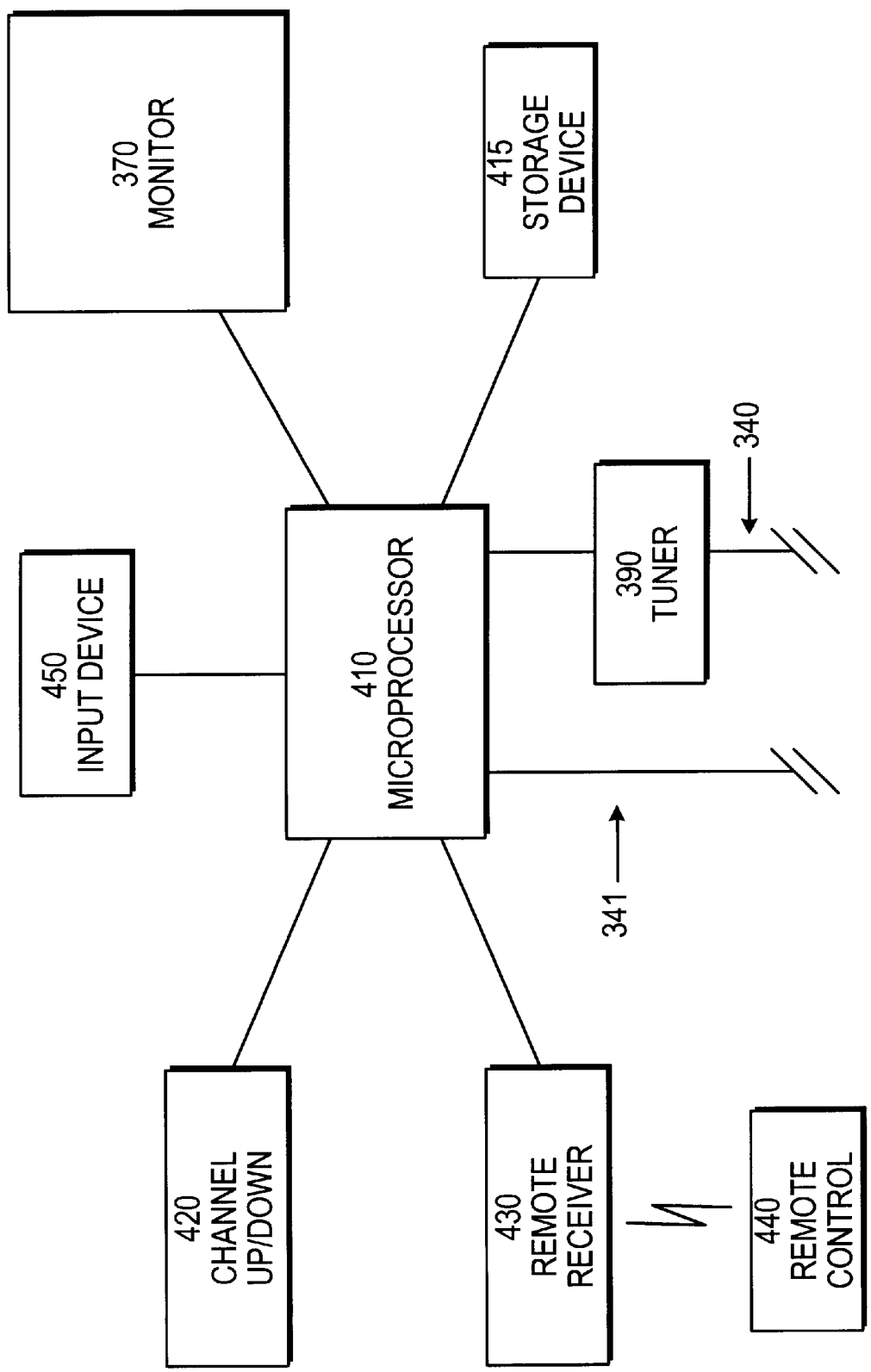
FIG. 5 is a block diagram of an embodiment of a television receiving apparatus of FIG. 4.

Turning to FIG. 5, the television receiving apparatus 350 may be included in a set-top converter, a television receiver or other conventional apparatus typically used to receive and cause the display of television pictures. An input device 450 is adapted to receive input from the subscriber. For example, the input device 450 may be used by the subscriber to respond to a query from the cable system provider, to request modification to the existing service such as adding or deleting a premium channel, etc.

A remote control unit 440 is adapted to transmit conventional control signals to the television receiving apparatus for controlling various functions such as channel selection, volume control, brightness, contrast, color adjustments, etc. Such control signals may be transmitted by infra-red transmission; and in that event the remote control unit includes an IR transmitter (not shown) and the television receiving apparatus includes a remote IR receiver 430. Alternatively, remote control unit 440 and remote IR receiver 430 may be omitted and the aforementioned control signals may be generated simply by operating corresponding controls directly on the television receiving apparatus (e.g., channel selector 420, a volume adjustment button, a picture control button and the like).

The control signals, whether received by remote IR receiver 430 or generated by control elements provided directly on the television receiving apparatus, such as channel selector 420, are coupled to a microprocessor 410 which controls the operation of a tuner 390 to tune to a selected television channel received at the input of the tuner. For example, the microprocessor may control tuner 390 to tune to a particular broadcast frequency over which a television program is transmitted. Alternatively, the microprocessor 410 may control tuner 390 to tune to a particular digital channel (as in direct satellite broadcast transmission) over which the television program is transmitted. The video signals which constitute the television program broadcast over the selected channel are supplied to the monitor 370 whereat they are displayed to the subscriber. It will be appreciated that the monitor 370 includes the usual video processing circuitry normally provided in television receiving apparatus to permit a television picture (and accompanying audio information) to be displayed to a viewer. The foregoing operation is typical of television receiving apparatus.

Although not described in detail, it will be appreciated that the microprocessor may be a conventional microprocessor, such as a relatively inexpensive, small eight-bit controller or a powerful, high-speed microprocessor for example, a "486"-type microprocessor or Pentium microprocessor manufactured by Intel Corp.

Returning to FIG. 4, each head-end 320 may also include a profile database 325, wherein the profile data representing the demographic of the subscriber is stored. As stated hereinabove with respect to the internet, the profile data may comprise home address, business address, length of residence, household income, gender, age group, the frequency of internet or cable use, but is not limited to such. The profile data may be supplied via a telephone to a representative of the cable television system, entered on the input device 450 of the television receiving apparatus 350, obtained from a questionnaire profile form completed by the subscriber or by other comparable means. If the profile data is entered on the input device 450 by the subscriber, the television receiving apparatus 350 transmits the profile data to the associated head-end 320 via the cable 340 or a dedicated channel or a data link 341. It is appreciated that the profile data may be encrypted and compressed before it is transmitted to the associated head-end 320.

The head-end 320 decrypts and decompresses the receive profile data, and forwards the decrypted and decompressed profile data to profile database 325 for storage. Alternatively, the decrypted and decompressed profile data may be stored in a central profile database (not shown) which is accessible by each head-end 320. Also, from time to time, additional demographic information may be requested from the subscribers and these additional demographic information may be stored with the profile data in the profile database 325 or separately in the additional profile database 326.

If the additional profile data is entered on the input device 450 by the subscriber, the television receiving apparatus 350 transmits the additional profile data to the associated head-end 320. The additional profile data may be encrypted and compressed before it is transmitted to the television receiving apparatus 350. The head-end 320 decrypts and decompresses the received additional profile data, and stores the additional profile data in the additional profile database 326 or the profile database 325.

Excluding the information channel, each broadcast channel contains a plurality of programs which are encoded so that only authorized subscribers of the cable television system may receive the broadcast programs. The information channel contains a plurality of information, such as advertisements, news, messages, announcements, updates and like, which are continuously broadcasted to the subscribers of the cable television system to form a sequence of information. The information may comprise but is not limited to texts, still pictures, moving pictures, video and audio components, or a combination thereof. It is appreciated that information from numerous information channels may be multiplexed and distributed to the subscribers. The encoding technique normally depends on each channel.

In accordance with the present invention, the information channel may receive a plurality of information from the INFO servers 360. Each INFO server may include a storage device 365 or like. The information to be broadcasted on the information channel is first retrieved from the respective storage device 365 and supplied to the information channel for distribution to the subscribers.

Alternatively, the sequence of information is selected for each subscriber in accordance with the subscriber's profile data which may also include the additional profile data. That is, a sequence of information is dynamically and individually generated for each subscriber. For example, if an advertiser chooses to target its advertisements to single females under 30 years of age with annual incomes exceeding $50,000, then these advertisements could be distributed to only those subscribers satisfying these demographic requirements. As stated hereinabove with respect to the internet, a part or all of the subscriber's profile data containing various demographic information may be used to generate the sequence of information.

As stated hereinabove with respect to the internet, for each information in the sequence, the respective storage device 365 may contain the INFO duration representing the length of time the information is to be displayed to the subscribers, e.g., display the information for 30 seconds; and the display time range representing the time of the day that the information is to be displayed to the subscribers, e.g., display the information within 7:00 PM to 8:00 PM. Accordingly, each INFO server 360 may transmit only those information satisfying the display time range requirements of the information as a part of the sequence of information to a particular subscriber. The sequence of information is selected for each subscriber based on the subscriber's profile data and the display time range of the information. In other words, the microprocessor 410 (FIG. 5) controls the tuner 390 (FIG. 5) to tune to a particular INFO channel to receive the sequence of information selected for that subscriber. It is appreciated that each subscriber may be categorized into groups based on the subscriber's profile data and each INFO channel is associated with a particular group.

Also, the profile data may contain information relating to the subscriber's time zone which can be used to generate the sequence of information. For example, if a particular information has a display time range of 6:00 PM to 8:00 PM and the current time is 9:00 PM EST (Eastern Standard Time), then this information would not be provided to any subscribers in the EST time zone, but would be supplied to subscribers in the Mountain and Pacific time zones.

Preferably, as stated hereinabove with respect to the ISP server 110 (FIG. 1), the associated head-end 320 may retrieve a sequence of INFO IDs from an INFO list database 327 for distribution to the subscribers. The sequence of INFO IDs may contain a list of the INFO IDs uniquely identifying each information in the sequence of information; the INFO durations representing the length of time each information is to be displayed to the subscribers; and display time ranges representing the time of the day that each information is to be displayed to the subscribers. The associated head-end 320 may transmit the sequence of INFO IDs to the television receiving apparatus 350 which stores the received sequence in a local storage device 415 (FIG. 5).

In accordance with the preferred embodiment of the present invention, the associated head-end 320 may generate a customized and individualized sequence of INFO IDs for each subscriber in accordance with the subscriber's profile data which may also include the additional profile data. That is, a sequence of INFO IDs is dynamically and individually generated for each subscriber. It is appreciated that this sequence of INFO IDs may be pre-generated for each subscriber during off-peak hours and provided to the subscriber's television receiving apparatus 350 when it is "turn on" or dynamically generated for each subscriber as part of the "logging in" process, i.e., when the television receiving apparatus "turns on" to connect to the cable network. This customized sequence of INFO IDs is then transmitted to the television receiving apparatus 350 associated with that subscriber. The television receiving apparatus 350 stores the received sequence of INFO IDs in the local storage device 415 (FIG. 5).

The microprocessor 410 (FIG. 5) of the television receiving apparatus 350 may request information corresponding to stored INFO IDs over the dedicated channel or data link 341 from the associated head-end 320 to which the television receiving apparatus 350. It is appreciated that the request for information may include more than one INFO ID and the subscriber ID of the television receiving apparatus 350. The associated head-end 320 forwards the request to the INFO server 360 which retrieves the requested information corresponding to the INFO ID from the storage device 365. The requested information is then transmitted to the associated head-end 320 for distribution to the requesting television receiving apparatus 350. The associated head-end 320 transmits the requested information to the television receiving apparatus 350 via the dedicated channel or data link 341. The microprocessor 410 stores the requested information in a local storage device 415 and supplies the requested information to the monitor 370 to be displayed to the subscriber. It is appreciated that the microprocessor 410 may request and store the information in advance from the associated head-end 320 in the local storage device 415 such that the information to be displayed is always available from the local storage device 415.

Alternatively, the associated head-end 320 may retrieve a sequence of channel IDs from an INFO list database 327 for distribution to the subscribers. The sequence of channel IDs may contain a list of the channel IDs uniquely identifying the information channel wherein the information may be received from the associated head-end 320 and the INFO durations representing the length of time the information receivable on each information channel corresponding to the channel IDs is to be displayed to the subscribers. The associated head-end 320 may transmit the sequence of channel IDs to the television receiving apparatus 350 which stores the received sequence in a local storage device 415 (FIG. 5).

In accordance with the preferred embodiment of the present invention, the associated head-end 320 may generate a customized and individualized sequence of channel IDs for each subscriber in accordance with the subscriber's profile data which may also include the additional profile data. That is, a sequence of channel IDs is dynamically and individually generated for each subscriber. It is appreciated that this sequence of channel IDs may be pre-generated for each subscriber during off-peak hours and provided to the subscriber's television receiving apparatus 350 when it is "turn on" or dynamically generated for each subscriber as part of the "logging in" process, i.e., when the television receiving apparatus "turns on" to connect to the cable network. This customized sequence of channel IDs is then transmitted to the television receiving apparatus 350 associated with that subscriber and to a session usage server 510 which stores the received sequence for that subscriber in the session usage database 515. The television receiving apparatus 350 stores the received sequence of channel IDs in the local storage device 415 (FIG. 5).

The microprocessor 410 of the subscriber's television receiving apparatus 350 may control the tuner 390 (FIG. 5) to tune to the information channels corresponding to stored channel IDs to receive the information selected for that subscriber. That is, the tuner 390 sequentially tunes to the information channel corresponding to each stored channel ID for the INFO duration specified for that information channel.

It is noted that only authorized subscribers, i.e., authorized television receiving apparatus 350, are permitted to be connected to the head-end 320 and unauthorized television receiving apparatus 350 are inhibited from displaying the sequence of information received from the INFO servers 360 and the program receivable on the broadcast channels.

As described hereinabove with respect to the internet, the login information is generated when authorized television receiving apparatus 350 "turns on" to receive programs from the associated head-end 320 (or connects to the associated head-end 320). The login information is stored in a session usage database 515 or like. The login information may comprise the login time and the login date, but is not limited to such information. For example, the login information may additionally contain a location ID, information relating to the locality of that television receiving apparatus 350. It is appreciated that the location ID may represent a zip code, a telephone number, a country name or code, a state or province name, or like. Alternatively, the login information may be transmitted to the session usage server 510 which generates the session usage record from the login information and stores the session usage record in the session usage database 515. It is appreciated that the session usage record may not necessarily contain all the login information.

Also, it is appreciated that the login time and the login date may be generated in accordance with a network system clock, thereby ensuring accurate and uniform login information from the television receiving apparatus 350. The network system clock may reside in the head-ends 320 or some other server on the satellite 310. Accordingly, the clock information of each television receiving apparatus 350 is not overwritten with the network system clock information, but each television receiving apparatus 350 stamps the information to be transmitted to the associated head-end 320 based on the network system clock. That is, each television receiving apparatus 350 has a real time and a virtual time based on the network system clock, and generates a virtual login time and a virtual login date based on the network system clock.

It is appreciated that the zip code and time zone of the subscriber may also be used to generate the sequence of information for that subscriber. For example, if a particular information has a display time range of 6:00 PM to 8:00 PM and the current time is 9:00 PM EST (Eastern Standard Time), then this information would not be provided to any U.S. subscribers in the EST time zone, but would be supplied to U.S. subscribers in the Mountain and Pacific time zones. It is appreciated that U.S. subscribers in the EST time zone will receive information having a display time range of 9:00 PM to 10:00 PM. This will advantageously permit the advertisers to target their advertisements based on the geographic location of the subscriber to consider regional preferences. That is, advertisers may want to use one advertisement for people in the east coast and another advertisement for people in the west coast. Also, it is appreciated the time zone and the display time range information may be used to insure that a particular advertisement is shown to all U.S. subscribers only from 6:00 PM to 7:00 PM.

The authorized subscriber selects (requests) a program to view by selecting the desired broadcast channel using the remote control unit 440 or the channel selector 420 on the television receiving apparatus 350. In response, the microprocessor 410 controls the tuner 390 to tune to a selected broadcast channel or a particular broadcast frequency over which the requested program is transmitted. The video signals which constitute the program broadcast over the selected broadcast channel are supplied to the monitor 370 whereat they are continuously displayed simultaneously with the sequence of information. As stated hereinabove with respect to the internet, the sequence of information and the requested program are displayed on the monitor 370 such that they are simultaneously viewable by the subscriber.

Figure 6:
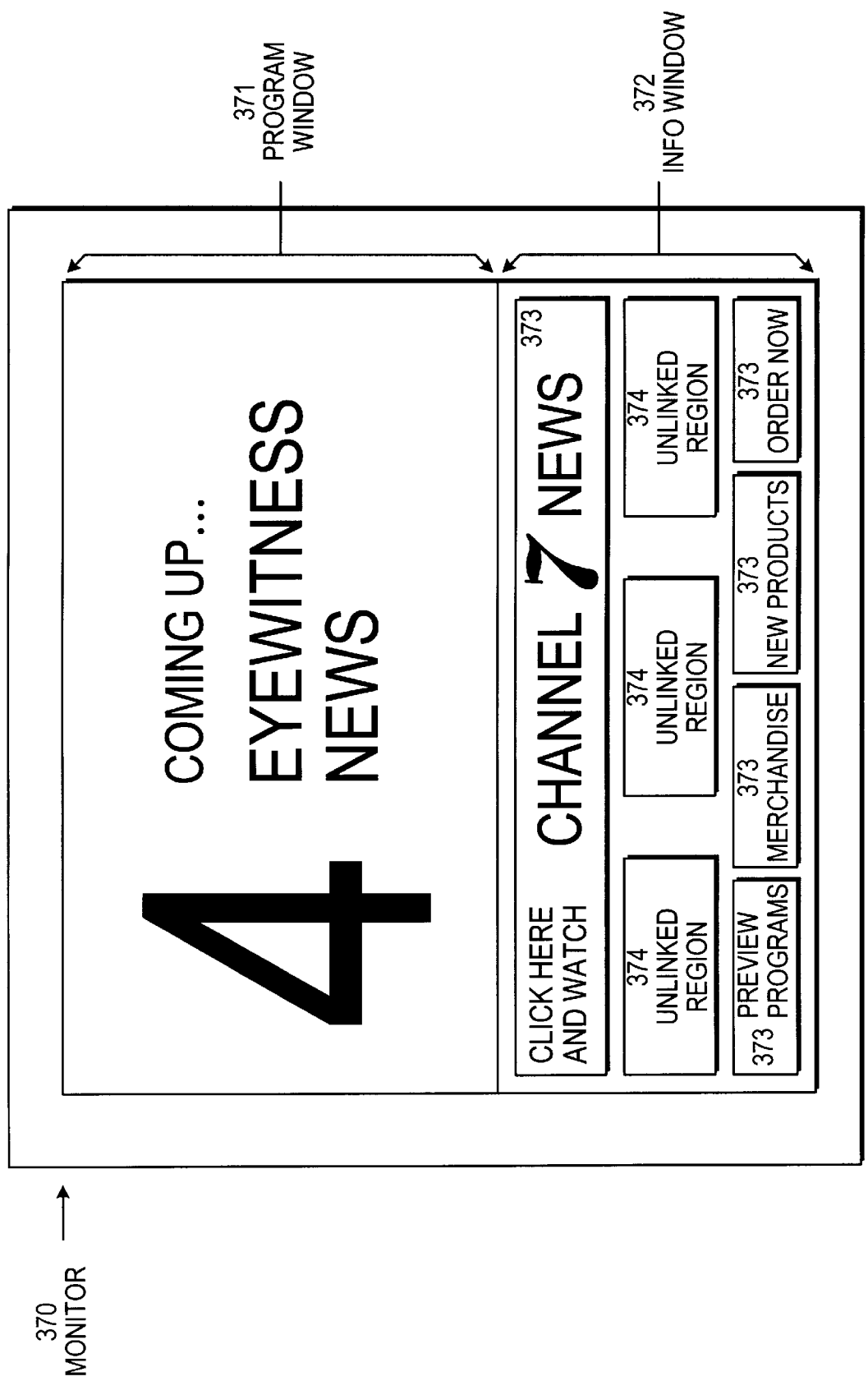
FIG. 6 is a block diagram of an embodiment of the INFO window and a program window of FIG. 5.

Preferably, the display of the sequence of information on the monitor 370 does not interfere with the display of the requested program. In such a scheme, the sequence of information may be displayed in a first portion of the monitor 370 and the requested program in a second portion of the monitor 370. For simplicity, the two portions of the monitor 370 will be referred hereinafter as a program or browser window 371 and an INFO window 372 as depicted in FIG. 6. Accordingly, the sequence of information is displayed in the INFO window 372 and the requested program is displayed in the program window 371. It is appreciated that each information in the sequence is displayed on the INFO window 372 for the assigned INFO duration, e.g., first information may be displayed for 30 seconds, second information for 15 seconds, etc.

As stated hereinabove with respect to the internet, the INFO window 372 may include unlinked regions 374 and linked regions 373 such as "Preview Programs", "Merchandise", "New Products" or "Order Now" as shown in FIG. 6. Each of the linked regions 373 may be linked to an INFO server 360 or a broadcasting station 310 (a data provider) on the satellite 310. The subscriber may click one of the linked regions 373 to preview new programs, receive additional information relating to merchandise and new products or to place an order. For example, if the subscriber clicks the linked region 373 labeled "Preview Programs" in FIG. 6, the television receiving apparatus 350 will be tuned to a broadcast channel or an INFO channel to display the program receivable on that channel on the program window 371. Additionally, the INFO window 372 may display a program that is currently receivable on a broadcast channel such as channel 10 and the subscriber may tune to channel 10 by simply clicking on the display of that program. That is, the linked region 373 may be connected to the microprocessor 410 of the television receiving apparatus 350 to control the tuner 390 to select the broadcast channel transmitting the program currently displayed on the INFO window 372. Preferably, as described hereinabove with the internet, the additional information displayed in the program window 371 may depend on the subscriber's profile data. It is appreciated that the linked regions 373 are not limited to those depicted in FIG. 6 and other linked regions are contemplated in the present invention.

Alternatively, if the subscriber clicks the linked region 373 labeled "Preview Programs," a pop-up window may be displayed on the program window 371 wherein the subscriber may be requested to complete a questionnaire form or to provide e-mail address, home address, fax number or like to receive a complementary copy of a video containing the program or a promotional brochure on the program. It is appreciated that the requested data may be retrieved from the profile database 1222 and displayed in the program window 371. The subscriber may accept (confirm) this retrieved data or modify the data so as to provide the additional information to another person. After the requested data is either entered or selected by the subscriber, the television receiving apparatus 350 transmits the requested data to the associated head-end 320 via the data link 341. Preferably, the associated head-end 320 stores or updates the subscriber's additional profile information in the additional profile database 286 in accordance with the completed questionnaire form or the requested data. Alternatively, the ISP server 110 retrieves the profile data associated with the subscriber from the profile database 326, and stores or updates the subscriber's additional profile information in the additional profile database 326 in accordance with the completed questionnaire form or the requested data, subscriber ID and the subscriber's profile data. It is appreciated that this advantageously permits the present invention to provide a mechanism for interactive communication between the subscriber and the INFO provider. Also, other means of providing the requested data is contemplated such as a radio button for exclusive selections, check boxes for multiple selections and like.

It is appreciated that although the subscriber cannot control the display of the sequence of information on the INFO window 372 of the monitor 370, the subscriber can select another program to be displayed on the program window 371 by selecting another broadcast channel using the remote control unit 440 or the channel selector 420.

Alternatively, the contents of the INFO window 372, each information in the sequence of information, can be characterized as an unsolicited request for a program (data) from one of the broadcasting stations. In other words, the programs displayed on the program window 371 represent solicited programs requested by the subscriber, whereas the materials (programs) displayed on the INFO window 372 represent unsolicited programs not requested by the subscriber. Essentially, without informing the subscriber, the television receiving apparatus 350 automatically tunes to a broadcast channel to request (select) a program that is receivable on that broadcast channel to be displayed on the INFO window 372.

Preferably, the broadcast channels (or broadcast stations) may be divided into two groups, wherein the tuner 390 is operable to tune to the first group of broadcast channels in response to a solicited request and second group of broadcast channels in response to an unsolicited request. That is, the microprocessor 410 does not permit the tuner 390 to tune to the second group of broadcast channels in response to a control signal from the remote control unit 440 or the channel selector 420. Any solicited request for programs from the second group of broadcast channels is denied and the program window 371 may display a message such as "channel unavailable".

When the television receiving apparatus 350 is determined to be disconnected from the associated head-end 320, the associated head-end 320 generates the logout information and stores the information in the session usage database 515. As stated hereinabove with respect to the internet, the logout information may comprise the logout time and the logout date, but is not limited to such information. Alternatively, each television receiving apparatus 350, namely the microprocessor 410, may generate the logout information if the subscriber disconnects the television receiving apparatus 350 from the associated head-end 320 by "turning off" the television receiving apparatus 350. It is appreciated that each television receiving apparatus 350 may generate the logout time and the logout date using the virtual clock rather than its internal clock to ensure accurate and uniform logout information.

Alternatively, the associated head-end 320 transmits the logout information to the session usage server 510. Similar to the session usage server 210 in FIG. 1, the session usage server 510 generates the session duration information as a function of the subscriber's stored login date, the subscriber's stored login time, the received logout date and the received logout time. The session usage server 510 updates the session usage record of the subscriber in response to the received logout date, the received logout time and the session duration information, and stores the updated session usage record in the session usage database 515. The updated session usage record of the subscriber may be used along with the subscriber's profile data to select the sequence of information for the subscriber. That is, the data generated from the current session for the subscriber may be used to generate the sequence of information for the next session. It is noted that the current session implies the subscriber's current connection to the associated head-end 320.

It is appreciated that the television receiving apparatus 350 may be disconnected from the associated head-end 320 due to faulty connection, hardware and software problems, power outage, etc. Preferably, to account for such disconnections, each television receiving apparatus 350 generates a ping signal every predetermined interval, e.g., every 5, 10 or 15 minutes and transmits the ping signal to the associated head-end 320. It is appreciated that the ping signal may include information identifying the source of the ping signal such as the subscriber ID and channel ID indicating the subscriber's selected channel.

The associated head-end 320 forwards the ping signal to the session usage database 515. It is contemplated that the session usage database 515 stores information relating to the expected time of the next ping signal for each subscriber.

When the television receiving apparatus "turns on" to connect to the associated head-end 320, the session usage database 515 sets the expected time of the next ping signal for that subscriber to the current time plus a multiple number of the predetermined ping signal interval. That is, upon the receipt of login information from the television receiving apparatus 350, the session usage database 515 sets the expected time of the next ping signal for that subscriber.

If a ping signal is received substantially within the expected time from the television receiving apparatus 350 (the microprocessor 410), then the session usage database 515 updates the expected time of the next ping signal for that subscriber. Preferably, the associated head-end 320 may transmit the ping signal to the session usage server 510 which forwards the ping signal to the session usage database 515 for processing and storage. However, if a ping signal is not received substantially within the expected time from that television receiving apparatus 350, then the television receiving apparatus 350 is presumed to be disconnected from the associated head-end 320. Preferably, the session usage server 510 transmits a disconnect signal to the associated head-end 320 to disconnect that television receiving apparatus 350 from the associated head-end 320. The session usage server 510 also generates and transmits the logout information for that subscriber to the session usage database 515 for storage. It is appreciated that the disconnect signal and logout information may be generated by the associated head-end 320 and transmitted to the session database 515 for storage.

As stated hereinabove with respect to the internet, it is appreciated for transmission efficiency and security the ping signal may be encrypted and compressed using standard encryption and compression techniques before it is transmitted to the associated head-end 320. In such a scenario, the session usage server 510 decrypts and decompresses the ping signal before updating the expected time of the next ping signal.

As stated hereinabove with respect to the internet, since the information displayed to the subscribers may represent advertisements, it may be important to keep track of what advertisements were transmitted and displayed to the subscribers. This information may be used to directly determine the number of people who viewed a particular advertisement. It is appreciated that this is comparable to Nielsen's or Arbitron's rating scheme for television and radio, except the present technique provides a more precise and detailed measurement of the viewing habits of the subscribers. That is, the present technique advantageously permits a more accurate demographic profile to be developed for each subscriber, thereby enabling the advertisers to selectively target their advertisements more effectively.

Accordingly, for each subscriber, the preferred embodiment of the present invention determines which information in the sequence of information was displayed to that subscriber based on the INFO durations and the subscriber's session usage record stored in the session usage database 515. Specifically, the subscriber's stored session duration information or the subscriber's stored login time, stored login date, stored logout time and stored logout date of the subscriber's session usage record may be used to determine which information was displayed on the television receiving apparatus 350. The result of this determination may be compiled as a list to provide a list of displayed information. This list of displayed information is then stored in an INFO display database 525 or like. It is appreciated that the list of displayed information may be stored in the local storage device 415 (FIG. 5) of the television receiving apparatus 350 before the list is transmitted to the INFO display database 525. Also, it is appreciated that this list of displayed information for each subscriber may be a list of INFO IDs and INFO durations corresponding to the information that was displayed to that subscriber.

The list of displayed information for each subscriber may additionally contain the subscriber ID and information relating to the display date and display time that a particular information in that list of displayed information was displayed to that subscriber. It is appreciated that the display date and the display time information may be derived from the INFO durations and the subscriber's session usage record stored in the session usage database 515, namely from subscriber's login time, login date, logout time and logout date.

The list of displayed information for each subscriber may further contain information relating to the locality of that television receiving apparatus 350, namely the location ID. Alternatively, the list of displayed information for each subscriber may be transmitted to the session usage server 515 which generates an INFO display record for each INFO ID in that list of displayed information and stores the INFO display record in the INFO display database 525. It is appreciated that the session usage server 510 may not necessarily use all of the information contained in the list of displayed information to generate the INFO display record. Also, the INFO display record of the subscriber may be used along with the subscriber's profile data to select the sequence of information for the subscriber. That is, the information displayed to the subscriber in his/her current session may be used to generate the sequence of information for the next session.

In addition, for each displayed information, the present invention keeps track of all of the linked regions 373 selected (or clicked) by each subscriber during the display of that information to provide a linked region ID. This information may be used to determine the subscriber's interest in a particular product, company, channel or like, providing a more accurate information on the viewing habits of the subscriber. Also, this information may be used to develop a targeted advertising strategy, where the advertisers can determine the subscribers who are more likely to be interested in receiving such information. It is appreciated that since each linked region 373 is connected to a particular data provider (i.e., broadcasting station or INFO server), each linked region ID may represent a selected data provider ID.

If it is determined that at least one linked region 373 has been selected by a subscriber, the television receiving apparatus 350 associated with that subscriber generates and transmits a clicked event report packet to the associated head-end 320. It is appreciated that the television receiving apparatus 350 may store the clicked event report packet in the local storage device 415 (FIG. 5) before transmitting the clicked event report packet to the associated head-end 320. The clicked event report packet may contain the subscriber ID of the television receiving apparatus 350, the displayed INFO ID of the displayed information, the selected data provider ID corresponding to the clicked linked region 373, the date and time the information was displayed on the television receiving apparatus 350 to provide the display date and the display time of the displayed information, and the location ID defining the locality of the television receiving apparatus 350. It is appreciated that the television receiving apparatus 350 may generate the display date and display time using the virtual clock rather than its internal clock to ensure accurate and uniform information. Also, it is appreciated that the clicked event report packet may be encrypted and compressed before it is transmitted to the associated head-end 320 for transmission efficiency and security purposes.

The associated head-end 320 forwards and stores the received clicked event report packet in the clicked event database 535. Alternatively, the associated head-end 320 may forward the clicked event report packet to the clicked event server 530 which decrypts and decompresses the received clicked event report packet, and generates a clicked event record. The clicked event record is then stored in the clicked event database 535. It is appreciated that the clicked event server 530 may not necessarily use all of the information in the clicked event report packet to generate the clicked event record. Also, the clicked event record of the subscriber may be used along with the subscriber's profile data to select the sequence of information for the subscriber. That is, the information selected by the subscriber in his/her current session may be used to generate the sequence of information for the next session.

Further, it may be advantageous to keep track of the broadcasting channels selected by the subscriber to develop a more precise profile on each subscriber. Thereby, enabling the advertisers to better select their target audience (subscribers) for their promotions, advertisements and like.

Accordingly, for each subscriber, the present invention determines all the broadcasting channels selected by that subscriber and stores the corresponding data provider IDs in the primary session log database 545. It is appreciated that each time a new broadcast channel is selected to display the program receivable on that selected broadcast channel on the program window 371, the television receiving apparatus 350 associated with that subscriber may generate and transmit the session log packet to the associated head-end 320. It is appreciated that the television receiving apparatus 350 may store the session log packet in the local storage device 415 before transmitting the session log packet to the associated head-end 320. The session log packet may contain the subscriber ID of the television receiving apparatus 350, the data provider ID of the broadcast channel selected by the subscriber, the date and time the program receivable on the selected (requested) broadcast channel was displayed on the television receiving apparatus 350 to provide the display date and the display time of the requested program, and the location ID defining the locality of the television receiving apparatus 350. Also, it is appreciated that the television receiving apparatus 350 may generate the display date and display time using the virtual clock rather than its internal clock to ensure accurate and uniform information. Further, it is appreciated that the session log packet may be encrypted and compressed before it is transmitted to the associated head-end 320.

The associated head-end 320 forwards and stores the received session log packet in the primary session log database 545. Alternatively, the associated head-end 320 may forward the session log packet to the session log server 540 which decrypts and decompresses the received session log packet, and generates the primary data display record. The primary data display record is then stored in the primary session log database 545.

Also, the session log server 540 may forward a request for profile data associated with the subscriber ID to the head-ends 320. Each head-end 320 searches its profile database 325 for the requested profile data corresponding to the subscriber ID. When the requested profile data is located by the associated head-end 320, the associated head-end 320 forwards the requested profile data to the session log server

540. The session log server 540 additionally generates a secondary data display record substituting the subscriber ID information in the primary data display record with the profile data information associated with that subscriber ID. The secondary data display record is then stored in the secondary session log database 546. That is, the session log server 540 may combine information from the various databases to generate a customized record. For example, a record may be created to provide viewing habits of subscribers belonging to a particular demographic group such as married male under 35 with annual income exceeding $100,000 living in New York City. It is appreciated that the session log server 540 may not necessarily use all of the information in the session log packet to generate the primary and secondary data display records.

Further, the data display record of the subscriber may be used along with the subscriber's profile data to select the sequence of information for the subscriber. That is, the broadcast channels selected by the subscriber in his/her current session may be used to generate the sequence of information for the next session.

While the present invention has been particularly shown and described with reference to a preferred embodiment, it will be readily appreciated that various changes may be made without departing from the spirit and scope of the invention. For example, instead of storing the information in various databases, all of the information may be stored in a single database or a single storage device. Also, the information such as the clicked event report, the session log packet and like may be stored in the subscriber terminal 130 and the television receiving apparatus 350 before they are transmitted to the respective databases for storage via the ISP server 110 and the associated head-end 320, respectively. This advantageously permits the subscriber terminal 130 and the television receiving apparatus 350 to queue the information and transmit the information in bulk to the ISP server 110 and the associated head-end 320, respectively, during off-peak hours when the network is less congested.

Additionally, instead of storing the profile data and additional profile data in the profile databases 325 and additional profile databases 326 associated with each head-end 320, they may stored in a single profile database 325 and a single additional profile database 326 connected to the satellite 310.

Further, it is appreciated that each server and database may be mirrored for redundancy to provide a more reliable and robust system. The information stored in various databases may be additionally backed up in a central database every predetermined interval or during off-peak hours to provide recoverability, efficiency and security. Alternatively, each database may backup another database so that there is always a primary and secondary databases for any given information.

It is intended that the appended claims be interpreted as including the embodiment discussed above, those various alternatives which have been described and all equivalents thereto.

What is claimed:

1. A method of delivering information to subscribers on a communication network, wherein a plurality of data providers and a plurality of processing devices, each processing device uniquely associated with a subscriber, are connected to said network, comprising the steps of:

receiving a sequence of INFO IDs by said plurality of processing devices, each INFO ID uniquely identifying information in a plurality of INFO sources connected to said network;

reading a sequence of information from said plurality of INFO sources in accordance with said sequence of INFO IDs;

selecting at least one data provider by each subscriber to display data that is received from said at least one data provider via said network; and continuously displaying said sequence of information simultaneously with said data received from said at least one data provider selected by said each subscriber on an associated processing device such that said sequence of information and said data requested by said each subscriber are simultaneously viewable, and wherein said data to be displayed on said associated processing device is selectable by said each subscriber, the display of said sequence of information is not controllable by said each subscriber and does not change in response to the selection of said data by said each subscriber.

2. The method of claim 1, further comprising the step of selecting another data provider in response to an input from said each subscriber and wherein the step of continuously displaying displays said sequence of information simultaneously with data received from said other data provider.

3. The method of claim 1, wherein the step of continuously displaying displays said sequence of information without interfering with the display of said data received from said at least one data provider selected by said each subscriber.

4. The method of claim 1, further comprising the steps of:

verifying the authorization of said each subscriber to determine if said each subscriber is authorized to connect to said network; and inhibiting said associated processing device from displaying said sequence of information if it is determined that said each subscriber is not authorized to connect to said network.

5. The method of claim 4, further comprising the step of inhibiting said associated processing device from displaying said data received from said at least one data provider selected by said each subscriber if it is determined that said each subscriber is not authorized to connect to said network.

6. The method of claim 1, further comprising the steps of:

verifying the authorization of said each subscriber to determine if said each subscriber is authorized to connect to said network; and inhibiting said associated processing device from displaying said data received from said at least one data provider selected by said each subscriber if it is determined that said each subscriber is not authorized to connect to said network.

7. The method of claim 1, wherein said sequence of information contains a sequence of advertisements.

8. The method of claim 1, wherein said sequence of information contains a sequence of messages or announcements.

9. The method of claim 1, wherein said sequence of information contains a sequence of news.

10. The method of claim 1, wherein said sequence of information contains a sequence of updates.

11. The method of claim 1, wherein said sequence of information contains a sequence of advertisements, messages or announcements, news and updates.

12. The method of claim 1, wherein the information comprises texts.

13. The method of claim 1, wherein the information comprises still pictures.

14. The method of claim 1, wherein the information comprises moving pictures.

15. The method of claim 1, wherein the information comprises a video component and an audio component.

16. The method of claim 1, wherein the information is a combination of text, still pictures, moving pictures having video and audio components.

17. The method of claim 5, wherein said network is a computer network and said plurality of processing devices are terminals.

18. The method of claim 17, further comprising the steps of:

assigning a unique subscriber ID and a password to said each subscriber on said communication network; and storing said subscriber ID and said password for said each subscriber in a database.

19. The method of claim 18, further comprising the step of establishing a connection between each of said terminals and said computer network.

20. The method of claim 19, wherein each terminal includes an input device and wherein the step of establishing the connection includes the steps of:

entering a subscriber ID and a password on said input device by said each subscriber to initiate connection between a terminal associated with said each subscriber and said communication network;

transmitting said subscriber ID and said password entered on said input device to said database for verification;

determining whether said subscriber ID entered on said input device matches one of said subscriber IDs stored in said database to provide a verified subscriber ID;

verifying said password entered on said input device matches said password associated with said verified subscriber ID if said verified subscriber ID is found; and connecting said terminal associated with said each subscriber to said computer network if it is determined that said password entered on said input device matches a password stored in said database which is associated with said verified subscriber ID.

21. The method of claim 3, wherein said network is a computer network and said plurality of processing devices are terminals.

22. The method of claim 21, wherein each of said plurality of data providers is a server on said computer network and further comprising the step of selecting data to be displayed from said at least one data provider by said each subscriber.

23. The method of claim 22, wherein each of said terminals includes an input device and wherein the step of selecting data includes the step of:

entering a request for said data from said at least one server connected to said computer network on said input device of a terminal associated with said each subscriber; and transmitting said request for said data to said at least one server from said terminal associated with said each subscriber.

24. The method of claim 1, wherein said network is a computer network and wherein the step of receiving a sequence of information includes the steps of:

receiving a sequence of addresses from a database connected to a network, each address indicating the location of the information in said plurality of INFO sources; and reading said sequence of information from said plurality of INFO sources in accordance with said sequence of addresses.

25. The method of claim 5, further comprising the steps of:
    assigning an unique subscriber ID to each of said plurality of processing devices;
    generating a login time and a login date for said each subscriber if it is determined that said each subscriber is authorized to connect to said network; and
    storing said subscriber ID, said login time and said login date for said each subscriber in a database connected to said network if it is determined that said each subscriber is authorized to connect said network.

26. The method of claim 25, wherein the step of generating login time and login date includes the steps of:
    receiving from a source connected to said network a virtual date and a virtual time; and
    generating said login time and said login date for said each subscriber as a function of said virtual time and said virtual date, respectively.

27. The method of claim 25, further comprising the steps of:
    determining whether a processing device is no longer connected to said network;
    generating a logout time and a logout date for said each subscriber if it is determined that said processing device associated with said each subscriber is no longer connected to said network; and
    storing said logout time and said logout date for said each subscriber in said database if it is determined that said processing device associated with said each subscriber is no longer connected to said network.

28. The method of claim 27, further comprising the steps of:
    generating a session duration for said each subscriber as a function of said login time, said login date, said logout date and said logout time; and
    storing said session duration for said each subscriber in said database.

29. The method of claim 28, further comprising the steps of:
    generating a session usage record for said each subscriber containing said subscriber ID, said login time, said login date, said logout date, said logout time and said session duration; and
    storing said session usage record for said each subscriber in said database.

30. A method of delivering information to subscribers on a communication network, wherein a plurality of data providers and a plurality of processing devices, each processing device uniquely associated with a subscriber, are connected to said network, comprising the steps of:
    assigning an unique INFO ID and an INFO duration to each information from a plurality of INFO sources connected to said network to provide a plurality of INFO IDs and a plurality of INFO durations;
    storing said plurality of INFO IDs and said plurality of INFO durations in a database connected to said network;
    receiving a sequence of information by said plurality of processing devices;
    selecting at least one data provider by each subscriber to display data that is received from said at least one data provider via said network; and
    continuously displaying said sequence of information simultaneously with said data received from said at least one data provider selected by said each subscriber on an associated processing device such that said sequence of information and said data requested by said each subscriber are simultaneously viewable, and wherein said data to be displayed on said associated processing device is selectable by said each subscriber, the display of said sequence of information is not controllable by said each subscriber and said each information in said sequence of information is displayed for said INFO duration assigned to said each information before displaying next information in said sequence of information.

31. The method of claim 26, further comprising the steps of:
    determining whether a processing device is no longer connected to said network;
    generating a logout time and a logout date for said each subscriber as a function of said virtual date and said virtual time if it is determined that said processing device associated with said each subscriber is no longer connected to said network; and
    storing said logout date and said logout time for said each subscriber to said database if it is determined that said processing device associated with said each subscriber is no longer connected to said network.

32. The method of claim 31, further comprising the steps of:
    generating a session duration for said each subscriber as a function of said login time, said login date, said logout date and said logout time; and
    storing said session duration for said each subscriber to said database.

33. The method of claim 32, further comprising the steps of:
    generating a session usage record for said each subscriber containing said subscriber ID, said login time, said login date, said logout date, said logout time and said session duration; and
    storing said session usage record for said each subscriber in said database.

34. The method of claim 27, further comprising the steps of:
    assigning an INFO duration to each information in said sequence of information to provide a plurality of INFO durations
    storing said plurality of INFO IDs and said plurality of INFO durations in said database; and
    wherein the step of continuously displaying displays said each information in said sequence of information for said INFO duration assigned to said each information before displaying next information in said sequence of information.

35. The method of claim 34, further comprising the steps of:
    determining which information in said sequence of information was displayed on said associated processing device as a function of said login time, said login date, said logout date, said logout time and said plurality of INFO durations to provide a list of displayed information for said each subscriber; and
    storing said list of displayed information for said each subscriber in said database.

36. The method of claim 35, wherein said list of displayed information for said each subscriber contains a list of INFO IDs corresponding to the displayed information.

37. The method of claim 36, further comprising the steps of:
　determining date and time that each INFO ID in said list of displayed information was displayed on said associated processing device as a function of said login time, said login date, said logout time, said logout date and said plurality of INFO durations to provide a display date and a display time for said each INFO ID in said list of displayed information for said each subscriber; and
　storing said display date and said display time for said each INFO ID in said list of displayed information for said each subscriber in said database.

38. The method of claim 37, further comprising the steps of:
　generating an INFO display record for each INFO ID in said list of displayed information for said each subscriber, said INFO display record containing an INFO ID and said subscriber ID of said each subscriber, and said display date, said display time and said INFO duration associated with said INFO ID; and
　storing said INFO display record in said database.

39. The method of claim 31, further comprising the steps of:
　assigning an INFO duration to each information in said sequence of information to provide a plurality of INFO durations;
　storing said plurality of INFO IDs and said plurality of INFO durations in said database; and
　wherein the step of continuously displaying displays said each information in said sequence of information for said INFO duration assigned to said each information before displaying next information in said sequence of information.

40. The method of claim 39, further comprising the steps of:
　determining which information in said sequence of information was display to said each subscriber as a function of said login time, said login date, said logout date, said logout time and said plurality of INFO durations to provide a list of display information for said each subscriber; and
　storing said list of display information for said each subscriber in said database.

41. The method of claim 40, wherein said list of displayed information for said each subscriber contains a list of INFO IDs corresponding to the displayed information.

42. The method of claim 41, further comprising the steps of:
　determining date and time that each INFO ID in said list of displayed information was displayed on said associated processing device as a function of said login time, said login date, said logout time, said logout date and said plurality of INFO durations to provide a display date and a display time for said each INFO ID in said list of displayed information for said each subscriber; and
　storing said display date and said display time for said each INFO ID in said list of displayed information for said each subscriber in said database.

43. The method of claim 42, further comprising the steps of:
　generating an INFO display record for each INFO ID in said list of displayed information for said each subscriber, said INFO display record containing an INFO ID and said subscriber ID of said each subscriber, and said display date, said display time and said INFO duration associated with said INFO ID; and
　storing said INFO display record in said database.

44. The method of claim 37, further comprising the steps of:
　assigning a location ID for said each subscriber in accordance with the locality of said associated processing device; and
　storing said location ID for said each subscriber in said database.

45. The method of claim 44, wherein said location ID includes a zip code; wherein said associated processing device includes a storage device; and the method further comprising the steps of:
　generating an INFO display record for each INFO ID in said list of displayed information for said each subscriber, said INFO display record containing an INFO ID, said subscriber ID and said location ID of said each subscriber, and said display date, said display time and said INFO duration associated with said INFO ID;
　storing said INFO display record in said storage device of said associated processing device; and
　transmitting said INFO display record to said database.

46. The method of claim 44, further comprising the steps of:
　generating an INFO display record for each INFO ID in said list of displayed information for said each subscriber, said INFO display record containing an INFO ID, said subscriber ID and said location ID of said each subscriber, and said display date, said display time and said INFO duration associated with said INFO ID; and
　storing said INFO display record in said database.

47. The method of claim 42, further comprising the steps of:
　assigning a location ID for said each subscriber in accordance with the locality of said associated processing device; and
　storing said location ID for said each subscriber in said database.

48. The method of claim 47, further comprising the steps of:
　generating an INFO display record for each INFO ID in said list of displayed information for said each subscriber, said INFO display record containing an INFO ID, said subscriber ID and said location ID of said each subscriber, and said display date, said display time and said INFO duration associated with said INFO ID; and
　storing said INFO display record in said database.

49. The method of claim 47, wherein said location ID includes a zip code; wherein said associated processing device includes a storage device; and the method further comprising the steps of:
　generating an INFO display record for each INFO ID in said list of displayed information for said each subscriber, said INFO display record containing an INFO ID, said subscriber ID and said location ID of said each subscriber, and said display date, said display time and said INFO duration associated with said INFO ID;
　storing said INFO display record in said storage device of said associated processing device; and transmitting said INFO display record to said database.

50. The method of claim 32, further comprising the steps of:

assigning a location ID for said each subscriber in accordance with the locality of said associated processing device; and storing said location ID for said each subscriber in said database.

51. The method of claim 50, wherein said location ID includes a zip code.

52. The method of claim 50, further comprising the steps of:

generating a session usage record for said each subscriber containing said subscriber ID, said login time, said login date, said logout date, said logout time, said session duration and said location ID; and storing said session usage record for said each subscriber in said database.

53. The method of claim 28, further comprising the steps of:

assigning a location ID for said each subscriber in accordance with the locality of said associated processing device; and storing said location ID for said each subscriber in said database.

54. The method of claim 53, wherein said location ID includes a zip code.

55. The method of claim 53, further comprising the steps of:

generating a session usage record for said each subscriber containing said subscriber ID, said login time, said login date, said logout date, said logout time, said session duration and said location ID; and storing said session usage record for said each subscriber in said database.

56. A method of delivering information to subscribers on a communication network, wherein a plurality of data providers and a plurality of processing devices, each processing device uniquely associated with a subscriber, are connected to said network, comprising the steps of:

assigning an unique subscriber ID to each of said plurality of processing devices;

verifying the authorization of said each subscriber to determine if said each subscriber is authorized to connect to said network;

generating a login time and a login date for said each subscriber if it is determined that said each subscriber is authorized to connect to said network;

storing said subscriber ID, said login time and said login date for said each subscriber in a database connected to said network if it is determined that said each subscriber is authorized to connect said network;

receiving a sequence of information by said plurality of processing devices from a plurality of INFO sources connected to said network;

selecting at least one data provider by each subscriber to display data that is received from said at least one data provider via said network;

continuously displaying said sequence of information simultaneously with said data received from said at least one data provider selected by said each subscriber on an associated processing device if it is determined that said each subscriber is authorized to connect to said network, such that said sequence of information and said data requested by said each subscriber are simultaneously viewable, and wherein said data to be displayed on said associated processing device is selectable by said each subscriber and the display of said sequence of information is not controllable by said each subscriber;

generating a ping signal every predetermined interval by said associated processing device if it is determined that said each subscriber is authorized to connect to said network;

transmitting said ping signal to said database;

updating said database to indicate expected time of next ping signal from said each subscriber;

generating a logout time and a logout date for said each subscriber when said ping signal is not received from said associated processing device substantially within said expected time; and storing said logout time and said logout date for said each subscriber in said database.

57. The method of claim 31, further comprising the steps of:

generating a ping signal every predetermined interval by said associated processing device if it is determined that said each subscriber is authorized to connect to said network;

transmitting said ping signal to said database;

updating said database to indicate expected time of next ping signal from said each subscriber; and wherein the step of generating said logout time and said logout date generates said logout time and said logout date for said each subscriber when said ping signal is not received from said associated processing device substantially within said expected time.

58. The method of claim 30, wherein the step of continuously displaying includes the steps of:

determining date and time that each information in said sequence of information is displayed on said associated processing device to provide a display date and a display time, respectively; and storing said display date and said display time for said each information for said each subscriber in said database.

59. The method of claim 58, further comprising the steps of:

generating a plurality of INFO display records for said each subscriber, each INFO display record containing subscriber ID of said each subscriber, and said INFO ID, said display date, said display time and said INFO duration associated with said each information; and storing said plurality of INFO display records for said each subscriber in said database.

60. The method of claim 58, further comprising the steps of:

assigning a location ID for said each subscriber in accordance with the locality of said associated processing device; and storing said location ID for said each subscriber in said database.

61. The method of claim 60, wherein said location ID includes a zip code; wherein said associated processing device includes a storage device; and the method further comprising the steps of:

generating a plurality of INFO display records for said each subscriber, each INFO display record containing subscriber ID and location ID of said each subscriber, and said INFO ID, said display date, said display time and said INFO duration associated with said each information;

storing said plurality of INFO display records for said each subscriber in said storage device of said associated processing device; and transmitting said plurality of INFO display records for said each subscriber to said database.

62. The method of claim 60, further comprising the steps of:

generating a plurality of INFO display records for said each subscriber, each INFO display record containing subscriber ID and location ID of said each subscriber, and said INFO ID, said display date, said display time and said INFO duration associated with said each information; and storing said plurality of INFO display records for said each subscriber in said database.

63. The method of claim 3, wherein each of said plurality of processing devices includes a monitor having a first portion and a second portion, and an input device; and wherein the step of continuously displaying displays said sequence of information in said first portion of said monitor and displays said data received from said at least one data provider selected by each subscriber in said second portion of said monitor.

64. The method of claim 63, further comprising the steps of:

assigning an INFO duration to each information in said sequence of information to provide a plurality of INFO durations;

storing said plurality of INFO IDs and said plurality of INFO durations in a database connected to said network; and wherein the step of continuously displaying displays said each information in said sequence of information for said INFO duration assigned to said each information before displaying next information in said sequence of information.

65. The method of claim 64 wherein said first portion of said monitor is divided into a plurality of linked regions and a plurality of unlinked regions, each of said plurality of linked regions is linked to one of said plurality of data providers; and the method further comprising the step of selecting one of said plurality of linked regions by said each subscriber to receive additional information.

66. The method of claim 65, wherein each of said plurality of data providers is uniquely identified by a data provider ID and further comprising the steps of:

assigning an unique subscriber ID to said associated processing device;

detecting which information in said sequence of information is being displayed on said first portion of said monitor associated with said associated processing device to provide a displayed INFO ID;

determining date and time that information corresponding to said displayed INFO ID was displayed on said associated processing device to provide a display date and a display time, respectively;

detecting which one of said plurality of linked regions was selected by said each subscriber during the display of information corresponding to said displayed INFO ID to provide a selected data provider ID; and storing said subscriber ID, said displayed INFO ID, said selected data provider ID, said display date and said display time for said each subscriber in said database if it is detected that said one of said plurality of linked regions was selected by said each subscriber.

67. The method of claim 66, further comprising the steps of:

assigning a location ID for said each subscriber in accordance with the locality of said associated processing device; and storing said location ID for said each subscriber in said database.

68. The method of claim 67, wherein said location ID includes a zip code; wherein said associated processing device includes a storage device; and the method further comprising the steps of:

generating a plurality of clicked event records for said each subscriber, each clicked event record for said each subscriber being associated with a single selected data provider ID and said each clicked event record contains said subscriber ID, said location ID and said single selected data provider ID, and said displayed INFO ID, said display date and said display time associated with said single selected data provider ID;

storing said plurality of clicked event records for said each subscriber in said storage device of said associated processing device; and transmitting said plurality of clicked event records for said each subscriber to said database.

69. The method of claim 67, further comprising the steps of:

generating a plurality of clicked event records for said each subscriber, each clicked event record for said each subscriber being associated with a single selected data provider ID and said each clicked event record contains said subscriber ID, said location ID and said single selected data provider ID, and said displayed INFO ID, said display date and said display time associated with said single selected data provider ID; and storing said plurality of clicked event records for said each subscriber in said database.

70. The method of claim 1, wherein each information in said sequence of information is a unsolicited request for data from one of said plurality of data providers.

71. The method of claim 70, wherein said unsolicited request for data is limited to a subset of said plurality of data providers.

72. The method of claim 71, wherein the step of selecting at least one data provider inhibits the selection of a data provider in said subset by said each subscriber.

73. The method of claim 1, wherein each of said plurality of data providers is uniquely identified by a data provider ID and further comprising the steps of storing said subscriber ID and said data provider ID associated with at least one data provider selected by said each subscriber in a database connected to said network.

74. The method of claim 73, further comprising the steps of:

determining date and time said data received from said at least one data provider selected by said each subscriber was displayed on said associated processing device to provide a display date and a display time, respectively; and storing said display date and said display time in said database.

75. The method of claim 74, further comprising the steps of:

assigning a location ID for said each subscriber in accordance with the locality of said associated processing device; and storing said location ID for said each subscriber in said database.

76. The method of claim 75, wherein said location ID includes a zip code; wherein said associated processing device includes a storage device; and wherein the method further comprising the steps of:
generating a plurality of data display records for said each subscriber, each data display record for said each subscriber being associated with a single data provider ID stored in said database and said each data display record containing said subscriber ID, said location ID and said single data provider ID, and said display date and said display time associated with said single data provider ID;
storing said plurality of data display records for said each subscriber in said storage device of said associated processing device; and
transmitting said plurality of data display records for said each subscriber to said database.

77. The method of claim 75, further comprising the steps of:
generating a plurality of data display records for said each subscriber, each data display record for said each subscriber being associated with a single data provider ID stored in said database and said each data display record containing said subscriber ID, said location ID and said single data provider ID, and said display date and said display time associated with said single data provider ID; and
storing said plurality of data display records for said each subscriber in said database.

78. The method of claim 2, wherein said network is a cable television network; and wherein said plurality of processing devices are converter boxes.

79. The method of claim 78, wherein said each of said plurality of data providers represents a broadcast channel on said cable television network.

80. The method of claim 79, wherein each of said converter boxes includes a television receiving apparatus, wherein the step of selecting at least one data provider selects a broadcast channel to display a program that is received on said selected broadcast channel and wherein the step of continuously displaying displays said sequence of information simultaneously with said program received on said selected broadcast channel.

81. The method of claim 80, wherein the step of selecting another data provider selects a next broadcast channel to display a program that is received on said next broadcast channel in response to said input from said each subscriber and wherein the step of continuously displaying displays said sequence of information simultaneously with said program received on said next broadcast channel.

82. The method of claim 81, wherein the step of selecting another data provider includes operating a channel up button or a channel down button on a channel selector operable with said convertor box.

83. The method of claim 66, wherein the step of selecting one of said plurality of linked regions includes the step of displaying said additional information in said second portion of said monitor.

84. The method of claim 66, wherein the step of selecting one of said plurality of linked regions includes the steps of:
displaying a request for additional data to said each subscriber in said second portion of said monitor;
entering said additional data on said input device by said each subscriber; and
storing said additional data in said database.

85. A method of selectively delivering information to subscribers on a communication network, wherein a plurality of data providers and a plurality of processing devices, each processing device uniquely associated with a subscriber, are connected to said network, comprising the steps of:
storing profile data in a database connected to said network for each subscriber;
storing a plurality of information received from a plurality of INFO sources connected to said network in said database;
selecting a sequence of information for said each subscriber from said plurality of information in accordance with said profile data of said each subscriber, each information in said sequence of information being uniquely identified by an INFO ID;
receiving a sequence of INFO IDs for said each subscriber by a processing device associated with said each subscriber;
reading a sequence of information from said plurality of INFO sources in accordance with said sequence of INFO IDs;
selecting at least one data provider by said each subscriber to display data that is received from said at least one data provider via said network; and
continuously displaying said sequence of information for said each subscriber simultaneously with said data received from said at least one data provider selected by said each subscriber on said associated processing device such that said sequence of information for said each subscriber and said data requested by said each subscriber a resimultaneously viewable, and wherein said data to be displayed on said associated processing device is selectable by said each subscriber, the display of said sequence of information for said each subscriber is not controllable by said each subscriber and does not change in response to the selection of said data by said each subscriber.

86. The method of claim 85, further comprising the step of selecting another data provider in response to an input from said each subscriber and wherein the step of continuously displaying displays said sequence of information for said each subscriber simultaneously with data received from said other data provider.

87. The method of claim 85, wherein the step of continuously displaying displays said sequence of information for said each subscriber without interfering with the display of said data received from said at least one data provider selected by said each subscriber.

88. The method of claim 85, wherein each of said plurality of INFO sources includes an INFO database and wherein the step of storing a plurality of information includes the step of retrieving information from each database to generate said plurality of information.

89. The method of claim 85, further comprising the steps of:
verifying the authorization of said each subscriber to determine if said each subscriber is authorized to connect to said network; and
inhibiting said associated processing device from displaying said sequence of information for said each subscriber if it is determined that said each subscriber is not authorized to connect to said network.

90. The method of claim 89, further comprising the step of inhibiting said associated processing device from displaying said data received from said at least one data provider selected by said each subscriber if it is determined that said each subscriber is not authorized to connect to said network.

91. The method of claim 85, further comprising the steps of:
   verifying the authorization of said each subscriber to determine if said each subscriber is authorized to connect to said network; and
   inhibiting said associated processing device from displaying said data received from said at least one data provider selected by said each subscriber if it is determined that said each subscriber is not authorized to connect to said network.

92. The method of claim 85, wherein said sequence of information contains a sequence of advertisements.

93. The method of claim 85, wherein said sequence of information contains a sequence of messages or announcements.

94. The method of claim 85, wherein said sequence of information contains a sequence of news.

95. The method of claim 85, wherein said sequence of information contains a sequence of updates.

96. The method of claim 85, wherein said sequence of information contains a sequence of advertisements, messages or announcements, news and updates.

97. The method of claim 85, wherein the information comprises texts.

98. The method of claim 85, wherein the information comprises still pictures.

99. The method of claim 85, wherein the information comprises moving pictures.

100. The method of claim 85, wherein the information comprises a video and audio component.

101. The method of claim 85, wherein the information is a combination of text, still pictures and moving pictures.

102. The method of claim 90, wherein said network is a computer network and said plurality of processing devices are terminals.

103. The method of claim 102, further comprising the steps of:
   assigning a unique subscriber ID and a password to said each subscriber on said communication network; and
   storing said subscriber ID and said password for said each subscriber in said database.

104. The method of claim 103, further comprising the step of establishing a connection between each of said terminals and said computer network.

105. The method of claim 104, wherein each terminal includes an input device and wherein the step of establishing the connection includes the steps of:
   entering a subscriber ID and a password on said input device by said each subscriber to initiate connection between a terminal associated with said each subscriber and said communication network;
   transmitting said subscriber ID and said password entered on said input device to said database for verification;
   determining whether said subscriber ID entered on said input device matches one of said subscriber IDs stored in said database to provide a verified subscriber ID;
   verifying said password entered on said input device matches said password associated with said verified subscriber ID if said verified subscriber ID is found; and
   connecting said terminal associated with said each subscriber to said computer network if it is determined that said password entered on said input device matches a password stored in said database which is associated with said verified subscriber ID.

106. The method of claim 87, wherein said network is a computer network and said plurality of processing devices are terminals.

107. The method of claim 106, wherein each of said plurality of data providers is a server on said computer network and further comprising the step of selecting data to be displayed from said at least one data provider by said each subscriber.

108. The method of claim 107, wherein each of said terminals includes an input device and wherein the step of selecting data includes the step of:
   entering a request for said data from said at least one server connected to said computer network on said input device of a terminal associated with said each subscriber; and
   transmitting said request for said data to said at least one server from said terminal associated with said each subscriber.

109. The method of claim 85, wherein said network is a computer network and wherein said sequence of INFO IDs represents a sequence of addresses, each address indicating the location of one of said sequence of information in said plurality of INFO sources.

110. The method of claim 90, further comprising the steps of:
   assigning an unique subscriber ID to each of said plurality of processing devices;
   generating a login time and a login date for said each subscriber if it is determined that said each subscriber is authorized to connect to said network; and
   storing said subscriber ID, said login time and said login date for said each subscriber in said database if it is determined that said each subscriber is authorized to connect said network.

111. The method of claim 110, wherein the step of generating login time and login date includes the steps of:
   receiving from a source connected to said network a virtual date and a virtual time; and
   generating said login time and said login date for said each subscriber as a function of said virtual time and said virtual date, respectively.

112. The method of claim 110, further comprising the steps of:
   determining whether a processing device is no longer connected to said network;
   generating a logout time and a logout date for said each subscriber if it is determined that said processing device associated with said each subscriber is no longer connected to said network; and
   storing said logout time and said logout date for said each subscriber in said database if it is determined that said processing device associated with said each subscriber is no longer connected to said network.

113. The method of claim 112, further comprising the steps of:
   generating a session duration for said each subscriber as a function of said login time, said login date, said logout date and said logout time; and
   storing said session duration for said each subscriber in said database.

114. The method of claim 113, further comprising the steps of:
   generating a session usage record for said each subscriber containing said subscriber ID, said login time, said login date, said logout date, said logout time and said session duration; and storing said session usage record for said each subscriber in said database.

115. A method of selectively delivering information to subscribers on a communication network, wherein a plurality of data providers and a plurality of processing devices, each processing device uniquely associated with a subscriber, are connected to said network, comprising the steps of:

storing profile data in a database connected to said network for each subscriber;

storing a plurality of information received from a plurality of INFO sources connected to said network in said database;

assigning an unique INFO ID and an INFO duration to each information in said plurality of information to provide a plurality of INFO IDs and a plurality of INFO durations;

storing said plurality of INFO IDs and said plurality of INFO durations in said database;

selecting a sequence of information for said each subscriber from said plurality of information in accordance with said profile data of said each subscriber;

receiving said sequence of information for said each subscriber by a processing device associated with said each subscriber;

selecting at least one data provider by said each subscriber to display data that is received from said at least one data provider via said network; and continuously displaying said sequence of information for said each subscriber simultaneously with said data received from said at least one data provider selected by said each subscriber on said associated processing device such that said sequence of information for said each subscriber and said data requested by said each subscriber are simultaneously viewable, and wherein said data to be displayed on said associated processing device is selectable by said each subscriber, the display of said sequence of information for said each subscriber is not controllable by said each subscriber and said each information in said sequence of information is displayed for said INFO duration assigned to said each information before displaying next information in said sequence of information for said each subscriber.

116. The method of claim 111, further comprising the steps of:

determining whether a processing device is no longer connected to said network;

generating a logout time and a logout date for said each subscriber as a function of said virtual date and said virtual time if it is determined that said processing device associated with said each subscriber is no longer connected to said network; and storing said logout date and said logout time for said each subscriber to said database if it is determined that said processing device associated with said each subscriber is no longer connected to said network.

117. The method of claim 116, further comprising the steps of:

generating a session duration for said each subscriber as a function of said login time, said login date, said logout date and said logout time; and storing said session duration for said each subscriber to said database.

118. The method of claim 117, further comprising the steps of:

generating a session usage record for said each subscriber containing said subscriber ID, said login time, said login date, said logout date, said logout time and said session duration; and storing said session usage record for said each subscriber in said database.

119. The method of claim 112, further comprising the steps of:

assigning an INFO duration to each information in said plurality of information a plurality of INFO durations;

storing said plurality of INFO IDs and said plurality of INFO durations in said database; and wherein the step of continuously displaying displays said each information in said sequence of information for said INFO duration assigned to said each information before displaying next information in said sequence of information for said each subscriber.

120. The method of claim 119, further comprising the steps of:

determining which information in said sequence of information for said each subscriber was displayed on said associated processing device as a function of said login time, said login date, said logout date, said logout time and said INFO durations assigned to each information in said sequence of information for said each subscriber to provide a list of displayed information for said each subscriber; and storing said list of displayed information for said each subscriber in said database.

121. The method of claim 120, wherein said list of displayed information for said each subscriber contains a list of INFO IDs corresponding to the displayed information.

122. The method of claim 121, further comprising the steps of:

determining date and time that each INFO ID in said list of displayed information was displayed on said associated processing device as a function of said login time, said login date, said logout time, said logout date and said INFO durations assigned to each information in said sequence of information for said each subscriber to provide a display date and a display time for said each INFO ID in said list of displayed information for said each subscriber; and storing said display date and said display time for said each INFO ID in said list of displayed information for said each subscriber in said database.

123. The method of claim 122, further comprising the steps of:

generating an INFO display record for each INFO ID in said list of displayed information for said each subscriber, said INFO display record containing an INFO ID and said subscriber ID of said each subscriber, and said display date, said display time and said INFO duration associated with said INFO ID; and storing said INFO display record in said database.

124. The method of claim 116, further comprising the steps of:

assigning an INFO duration to each information in said plurality of information to provide a plurality of INFO durations;

storing said plurality of INFO IDs and said plurality of INFO durations in said database; and wherein the step of continuously displaying displays said each information in said sequence of information for said INFO duration assigned to said each information before displaying next information in said sequence of information for said each subscriber.

125. The method of claim 124, further comprising the steps of:

determining which information in said sequence of information for said each subscriber was displayed on said associated processing device as a function of said login time, said login date, said logout date, said logout time and said INFO duration assigned to each information in said sequence of information for said each subscriber to provide a list of display information for said each subscriber; and storing said list of displayed information for said each subscriber in said database.

126. The method of claim 125, wherein said list of displayed information for said each subscriber contains a list of INFO IDs corresponding to the displayed information.

127. The method of claim 126, further comprising the steps of:

determining date and time that each INFO ID in said list of displayed information was displayed on said associated processing device as a function of said login time, said login date, said logout time, said logout date and said INFO duration assigned to each information in said sequence of information for said each subscriber to provide a display date and a display time for said each INFO ID in said list of displayed information for said each subscriber; and storing said display date and said display time for said each INFO ID in said list of displayed information for said each subscriber in said database.

128. The method of claim 127, further comprising the steps of:

generating an INFO display record for each INFO ID in said list of displayed information for said each subscriber, said INFO display record containing an INFO ID and said subscriber ID of said each subscriber, and said display date, said display time and said INFO duration associated with said INFO ID; and storing said INFO display record in said database.

129. The method of claim 122, further comprising the steps of:

assigning a location ID for said each subscriber in accordance with the locality of said associated processing device; and storing said location ID for said each subscriber in said database.

130. The method of claim 129, wherein said location ID includes a zip code; wherein said associated processing device includes a storage device; and the method further comprising the steps of:

generating an INFO display record for each INFO ID in said list of displayed information for said each subscriber, said INFO display record containing an INFO ID, said subscriber ID and said location ID of said each subscriber, and said display date, said display time and said INFO duration associated with said INFO ID;

storing said INFO display record in said storage device of said associated processing device; and transmitting said INFO display record to said database.

131. The method of claim 129, further comprising the steps of:

generating an INFO display record for each INFO ID in said list of displayed information for said each subscriber, said INFO display record containing an INFO ID, said subscriber ID and said location ID of said each subscriber, and said display date, said display time and said INFO duration associated with said INFO ID; and storing said INFO display record in said database.

132. The method of claim 127, further comprising the steps of:

assigning a location ID for said each subscriber in accordance with the locality of said associated processing device; and storing said location ID for said each subscriber in said database.

133. The method of claim 132, further comprising the steps of:

generating an INFO display record for each INFO ID in said list of displayed information for said each subscriber, said INFO display record containing an INFO ID, said subscriber ID and said location ID of said each subscriber, and said display date, said display time and said INFOduration associated with said INFO ID; and storing said INFO display record in said database.

134. The method of claim 132, wherein said location ID includes a zip code; wherein said associated processing device includes a storage device; and the method further comprising the steps of:

generating an INFO display record for each INFO ID in said list of displayed information for said each subscriber, said INFO display record containing an INFO ID, said subscriber ID and said location ID of said each subscriber, and said display date, said display time and said INFO duration associated with said INFO ID;

storing said INFO display record in said storage device of said associated processing device; and transmitting said INFO display record to said database.

135. The method of claim 117, further comprising the steps of:

assigning a location ID for said each subscriber in accordance with the locality of said associated processing device; and storing said location ID for said each subscriber in said database.

136. The method of claim 135, wherein said location ID includes a zip code.

137. The method of claim 135, further comprising the steps of:

generating a session usage record for said each subscriber containing said subscriber ID, said login time, said login date, said logout date, said logout time, said session duration and said location ID; and storing said session usage record for said each subscriber in said database.

138. The method of claim 113, further comprising the steps of:

assigning a location ID for said each subscriber in accordance with the locality of said associated processing device; and storing said location ID for said each subscriber in said database.

139. The method of claim 138, wherein said location ID includes a zip code.

140. The method of claim 138, further comprising the steps of:

generating a session usage record for said each subscriber containing said subscriber ID, said login time, said login date, said logout date, said logout time, said session duration and said location ID; and storing said session usage record for said each subscriber in said database.

141. A method of selectively delivering information to subscribers on a communication network, wherein a plurality of data providers and a plurality of processing devices, each processing device uniquely associated with a subscriber, are connected to said network, comprising the steps of:

assigning an unique subscriber ID to each of said plurality of processing devices;

storing profile data in a database connected to said network for each subscriber;

storing a plurality of information received from a plurality of INFO sources connected to said network in said database;

selecting a sequence of information for said each subscriber from said plurality of information in accordance with said profile data of said each subscriber;

verifying the authorization of said each subscriber to determine if said each subscriber is authorized to connect to said network;

generating a login time and a login date for said each subscriber if it is determined that said each subscriber is authorized to connect to said network;

storing said subscriber ID, said login time and said login date for said each subscriber in said database if it is determined that said each subscriber is authorized to connect said network;

receiving said sequence of information for said each subscriber by a processing device associated with said each subscriber;

selecting at least one data provider by said each subscriber to display data that is received from said at least one data provider via said network;

continuously displaying said sequence of information for said each subscriber simultaneously with said data received from said at least one data provider selected by said each subscriber on said associated processing device if it is determined that said each subscriber is authorized to connect to said network, such that said sequence of information for said each subscriber and said data requested by said each subscriber are simultaneously viewable, and wherein said data to be displayed on said associated processing device is selectable by said each subscriber and the display of said sequence of information for said each subscriber is not controllable by said each subscriber;

generating a ping signal every predetermined interval by said associated processing device if it is determined that said each subscriber is authorized to connect to said network;

transmitting said ping signal to said database;

updating said database to indicate expected time of next ping signal from said each subscriber;

generating a logout time and a logout date for said each subscriber when said ping signal is not received from said associated processing device substantially within said expected time; and storing said logout time and said logout date for said each subscriber in said database.

142. The method of claim 116, further comprising the steps of:

generating a ping signal every predetermined interval by said associated processing device if it is determined that said each subscriber is authorized to connect to said network;

transmitting said ping signal to said database;

updating said database to indicate expected time of next ping signal from said each subscriber; and wherein the step of generating said logout time and said logout date generates said logout time and said logout date for said each subscriber when said ping signal is not received from said associated processing device substantially within said expected time.

143. The method of claim 115, wherein the step of continuously displaying includes the steps of:

determining date and time that each information in said sequence of information for each said subscriber was displayed on said associated processing device to provide a display date and a display time, respectively; and storing said display date and said display time of said each information for said each subscriber in said database.

144. The method of claim 143, further comprising the steps of:

generating a plurality of INFO display records for said each subscriber, each INFO display record containing subscriber ID of said each subscriber, and said INFO ID, said display date, said display time and said INFO duration associated with said each information; and storing said plurality of INFO display records for said each subscriber in said database.

145. The method of claim 143, further comprising the steps of:

assigning a location ID for said each subscriber in accordance with the locality of said associated processing device; and storing said location ID for said each subscriber in said database.

146. The method of claim 145, wherein said location ID includes a zip code; wherein said associated processing device includes a storage device; and the method further comprising the steps of:

generating a plurality of INFO display records for said each subscriber, each INFO display record containing subscriber ID and location ID of said each subscriber, and said INFO ID, said display date, said display time and said INFO duration associated with said each information;

storing said plurality of INFO display records for said each subscriber in said storage device of said associated processing device; and transmitting said plurality of INFO display records for said each subscriber to said database.

147. The method of claim 145, further comprising the steps of:

generating a plurality of INFO display records for said each subscriber, each INFO display record containing subscriber ID and location ID of said each subscriber, and said INFO ID, said display date, said display time and said INFO duration associated with said each information; and storing said plurality of INFO display records for said each subscriber in said database.

148. The method of claim 87, wherein each of said plurality of processing devices includes a monitor having a first portion and a second portion, and an input device; and wherein the step of continuously displaying displays said sequence of information for said each subscriber in said first portion of said monitor and displays said data received from said at least one data provider selected by each subscriber in said second portion of said monitor.

149. The method of claim 148, further comprising the steps of:
   assigning an INFO duration to each information in said plurality of information to provide a plurality of INFO durations;
   storing said plurality of INFO IDs and said plurality of INFO durations in said database; and
   wherein the step of continuously displaying displays said each information in said sequence of information for said INFO duration assigned to said each information before displaying next information in said sequence of information for said each subscriber.

150. The method of claim 149, wherein said first portion of said monitor is divided into a plurality of linked regions and a plurality of unlinked regions, each of said plurality of linked regions is linked to one of said plurality of data providers; and the method further comprising the step of selecting one of said plurality of linked regions by said each subscriber to receive additional information.

151. The method of claim 150, wherein each of said plurality of data providers is uniquely identified by a data provider ID and further comprising the steps of:
   assigning an unique subscriber ID to said associated processing device;
   detecting which information in said sequence of information for said each subscriber is being displayed on said first portion of said monitor associated with said associated processing device to provide a displayed INFO ID;
   determining date and time that information corresponding to said displayed INFO ID was displayed on said associated processing device to provide a display date and a display time, respectively;
   detecting which one of said plurality of linked regions was selected by said each subscriber during the display of information corresponding to said displayed INFO ID to provide a selected data provider ID; and
   storing said subscriber ID, said displayed INFO ID, said selected data provider ID, said display date and said display time for said each subscriber in said database if it is detected that said one of said plurality of linked regions was selected by said each subscriber.

152. The method of claim 151, further comprising the steps of:
   assigning a location ID for said each subscriber in accordance with the locality of said associated processing device; and
   storing said location ID for said each subscriber in said database.

153. The method of claim 152, wherein said location ID includes a zip code; wherein said associated processing device includes a storage device; and the method further comprising the steps of:
   generating a plurality of clicked event records for said each subscriber, wherein each clicked event record for said each subscriber is associated with a single selected data provider ID and said each clicked event record contains said subscriber ID, said location ID and said single selected data provider ID, and said displayed INFO ID, said display date and said display time associated with said single selected data provider ID;
   storing said plurality of clicked event records for said each subscriber in said storage device of said associated processing device; and
   transmitting said plurality of clicked event records for said each subscriber to said database.

154. The method of claim 152, further comprising the steps of:
   generating a plurality of clicked event records for said each subscriber, wherein each clicked event record for said each subscriber is associated with a single selected data provider ID and said each clicked event record contains said subscriber ID, said location ID and said single selected data provider ID, and said displayed INFO ID, said display date and said display time associated with said single selected data provider ID; and
   storing said plurality of clicked event records for said each subscriber in said database.

155. The method of claim 85, wherein each information in said sequence of information is a unsolicited request for data from one of said plurality of data providers.

156. The method of claim 155, wherein said unsolicited request for data is limited to a subset of said plurality of data providers.

157. The method of claim 156, wherein the step of selecting at least one data provider inhibits the selection of a data provider in said subset by said each subscriber.

158. The method of claim 85, wherein each of said plurality of data providers is uniquely identified by a data provider ID and further comprising the steps of storing said subscriber ID and said data provider ID associated with at least one data provider selected by said each subscriber in said database.

159. The method of claim 158, further comprising the steps of:
   determining a display date and a display time of said data received from said at least one data provider selected by said each subscriber on said associated processing device; and
   storing said display date and said display time in said database.

160. The method of claim 159, further comprising the steps of:
   assigning a location ID for said each subscriber in accordance with the locality of said associated processing device; and
   storing said location ID for said each subscriber in said database.

161. The method of claim 160, wherein said location ID includes a zip code; wherein said associated processing device includes a local storage; and the method further comprising the steps of:
   generating a plurality of data display records for said each subscriber, wherein each data display record for said each subscriber is associated with a single data provider ID stored in said database and said each data display record contains said subscriber ID, said location ID and said single data provider ID, and said display date and said display time associated with said single data provider ID;
   storing said plurality of data display records for said each subscriber in said storage device of said associated processing device; and transmitting said plurality of data display records for said each subscriber to said database.

162. The method of claim 160, further comprising the steps of:

generating a plurality of data display records for said each subscriber, wherein each data display record for said each subscriber is associated with a single data provider ID stored in said database and said each data display record contains said subscriber ID, said location ID and said single data provider ID, and said display date and said display time associated with said single data provider ID; and storing said plurality of data display records for said each subscriber in said database.

163. The method of claim 86, wherein said communication network is a cable television network and wherein said plurality of processing devices are converter boxes.

164. The method of claim 163, wherein said each of said plurality of data providers represents a broadcast channel on said cable television network.

165. The method of claim 164, wherein each of said converter boxes includes a television receiving apparatus, wherein the step of selecting at least one data provider selects a broadcast channel to display a program that is received on said selected broadcast channel and wherein the step of continuously displaying displays said sequence of information for said each subscriber simultaneously with said program received on said selected broadcast channel.

166. The method of claim 165, wherein the step of selecting another data provider selects a next broadcast channel to display a program that is received on said next broadcast channel in response to said input from said each subscriber and wherein the step of continuously displaying displays said sequence of information for said each subscriber simultaneously with said program received on said next broadcast channel.

167. The method of claim 166, wherein the step of selecting another data provider includes operating a channel up button or a channel down button on a channel selector operable with said convertor box.

168. The method of claim 105, wherein the step of connecting said terminal includes the steps of:

selecting an access phone number by said each subscriber; and connecting said terminal to said computer network using said access phone number.

169. The method of claim 168, wherein the step of selecting a sequence of information selects said sequence of information for said each subscriber in accordance with said profile data and said access phone number associated with said each subscriber.

170. The method of claim 168, further comprising the steps of:

assigning a location ID for said each subscriber in accordance with the locality of said associated processing device; and storing said location ID for said each subscriber in said database.

171. The method of claim 170, wherein said location id includes at least a zip code.

172. The method of claim 171, further comprising the steps of:

determining whether said zip code stored for said each subscriber is associated with said access phone number selected by said each subscriber;

assigning said zip code as a location zip code for said each subscriber if it is determined that said zip code is associated with said access phone number; and assigning said location zip code for said each subscriber in accordance with said access phone number if it is determined that said zip code is not associated with said access phone number.

173. The method of claim 172, wherein the step of selecting a sequence of information selects said sequence of information for said each subscriber in accordance with said profile data and said location zip code associated with said each subscriber.

174. The method of claim 173, further comprising the step of determining a time zone in accordance with said location zip code.

175. The method of claim 174, further comprising the steps of:

assigning a display time range to each of said plurality of information to provide a plurality of display time ranges; and storing said plurality of display time ranges in said database.

176. The method of claim 175, wherein the step of selecting a sequence of information selects said sequence of information for said each subscriber in accordance with said profile data, said location zip code, a current time and said time zone associated with said each subscriber, and said plurality of display time ranges.

177. The method of claim 168, further comprising the steps of:

assigning a display time range to each of said plurality of information to provide a plurality of display time ranges; and storing said plurality of display time ranges in said database.

178. The method of claim 168, wherein the step of selecting a sequence of information selects said sequence of information for said each subscriber in accordance with said profile data, said access phone number and a current time associated with said each subscriber, and said plurality of display time ranges.

179. The method of claim 85, wherein each of said plurality of processing devices includes an input device and wherein the method of storing profile data includes the step of entering said profile data on said input device of said associated processing device by said each subscriber.

180. The method of claim 179, further comprising the steps of:

assigning an unique subscriber ID to each of said plurality of processing devices;

entering additional profile data on said input device by said each subscriber; and storing said subscriber ID and said additional profile data for said each subscriber in said database.

181. The method of claim 180, wherein the step of selecting a sequence of information selects said sequence of information for said each subscriber in accordance with said profile data and said additional profile data.

182. The method of claim 114, wherein the step of selecting a sequence of information selects said sequence of information for said each subscriber in accordance with said profile data and said session usage record.

183. The method of claim 118, wherein the step of selecting a sequence of information selects said sequence of information for said each subscriber in accordance with said profile data and said session usage record.

184. The method of claim 137, wherein the step of selecting a sequence of information selects said sequence of information for said each subscriber in accordance with said profile data and said session usage record.

185. The method of claim 140, wherein the step of selecting a sequence of information selects said sequence of information for said each subscriber in accordance with said profile data and said session usage record.

186. The method of claim 123, wherein the step of selecting a sequence of information selects said sequence of information for said each subscriber in accordance with said profile data and said INFO display record.

187. The method of claim 128, wherein the step of selecting a sequence of information selects said sequence of information for said each subscriber in accordance with said profile data and said INFO display record.

188. The method of claim 131, wherein the step of selecting a sequence of information selects said sequence of information for said each subscriber in accordance with said profile data and said INFO display record.

189. The method of claim 133, wherein the step of selecting a sequence of information selects said sequence of information for said each subscriber in accordance with said profile data and said INFO display record.

190. The method of claim 144, wherein the step of selecting a sequence of information selects said sequence of information for said each subscriber in accordance with said profile data and said INFO display record.

191. The method of claim 147, wherein the step of selecting a sequence of information selects said sequence of information for said each subscriber in accordance with said profile data and said INFO display record.

192. The method of claim 154, wherein the step of selecting a sequence of information selects said sequence of information for said each subscriber in accordance with said profile data and said plurality of clicked event records.

193. The method of claim 162, wherein the step of selecting a sequence of information selects said sequence of information for said each subscriber in accordance with said profile data and said plurality of data display records.

194. The method of claim 85, wherein said database comprises at least first and second databases; wherein the method of storing profile data stores said profile data in said first database; and wherein the method of storing a plurality of information stores said plurality of information in said second database.

195. The method of claim 103, wherein said database comprises at least first, second and third databases; wherein the method of storing profile data stores said profile data in said first database; wherein the method of storing a plurality of information stores said plurality of information in said second database; and wherein the method of storing said subscriber ID and said password stores said subscriber ID and said password in said third database.

196. The method of claim 114, wherein said database comprises at least first, second and third databases; wherein the method of storing profile data stores said profile data in said first database; wherein the method of storing a plurality of information stores said plurality of information in said second database; wherein the method of storing said subscriber ID, said login time and said login date stores said subscriber ID, said login time and said login date in said third database; wherein the method of storing said logout time and said logout date stores said logout time and said logout date in said third database; wherein the method of storing said session duration stores said session duration in said third database; and wherein the method of storing said session usage record stores said session usage records in said third database.

197. The method of claim 128, wherein said database comprises at least first, second and third databases; wherein the method of storing profile data stores said profile data in said first database; wherein the method of storing a plurality of information stores said plurality of information in said second database; wherein the method of storing said subscriber ID, said login time and said login date stores said subscriber ID, said login time and said login date in said third database; wherein the method of storing said logout time and said logout date stores said logout time and said logout date in said third database; wherein the method of storing said plurality of INFO IDs and said plurality of INFO durations stores said plurality of INFO IDs and said plurality of INFO durations in said third database; wherein the method of storing said list of displayed information stores said list of displayed information in said third database; wherein the method of storing said display date and said display time stores said display date and said display time in said third database; and wherein the method of storing said INFO display record stores said INFO display record in said third database.

198. The method of claim 131, wherein said database comprises at least first, second and third databases; wherein the method of storing profile data stores said profile data in said first database; wherein the method of storing a plurality of information stores said plurality of information in said second database; wherein the method of storing said subscriber ID, said login time and said login date stores said subscriber ID, said login time and said login date in said third database; wherein the method of storing said logout time and said logout date stores said logout time and said logout date in said third database; wherein the method of storing said plurality of INFO IDs and said plurality of INFO durations stores said plurality of INFO IDs and said plurality of INFO durations in said third database; wherein the method of storing said list of displayed information stores said list of displayed information in said third database; wherein the method of storing said display date and said display time stores said display date and said display time in said third database; wherein the method of storing said location ID stores said location ID in said third database; and wherein the method of storing said INFO display record stores said INFO display record in said third database.

199. The method of claim 137, wherein said database comprises at least first, second and third databases; wherein the method of storing profile data stores said profile data in said first database; wherein the method of storing a plurality of information stores said plurality of information in said second database; wherein the method of storing said subscriber ID, said login time and said login date stores said subscriber ID, said login time and said login date in said third database; wherein the method of storing said logout time and said logout date stores said logout time and said logout date in said third database; wherein the method of storing said session duration stores said session duration in said third database; wherein the method of storing location ID stores said location ID in said third database; and wherein the method of storing said session usage record stores said session usage records in said third database.

200. The method of claim 154, wherein said database comprises at least first, second and third databases; wherein the method of storing profile data stores said profile data in said first database; wherein the method of storing a plurality of information stores said plurality of information in said second database; wherein the method of storing said plurality of INFO IDs and said plurality of INFO durations stores said plurality of INFO IDs and said plurality of INFO durations in said third database; wherein the method of storing said subscriber ID, said displayed INFO ID, said selected data provider ID, said display date and said display time stores said subscriber ID, said displayed INFO ID, said selected data provider ID, said display date and said display time in said third database; wherein the method of storing location ID stores said location ID in said third database; and wherein the method of storing said plurality of clicked event records stores said plurality of clicked event records in said third database.

201. The method of claim 162, wherein said database comprises at least first, second and third databases; wherein the method of storing profile data stores said profile data in said first database; wherein the method of storing a plurality of information stores said plurality of information in said second database; wherein the method of storing said subscriber ID and said data provider ID stores said subscriber ID and said data provider ID in said third database; wherein the method of storing said display date and said display time stores said display date and said display time in said third database; wherein the method of storing said location ID stores said location ID in said third database; and wherein the method of storing said plurality of data display records stores said plurality of data display records in said third database.

202. The method of claim 180, wherein said database comprises at least first, second and third databases; wherein the method of storing profile data stores said profile data in said first database; wherein the method of storing a plurality of information stores said plurality of information in said second database; and wherein the method of storing said subscriber ID and said additional profile data stores said subscriber ID and said additional profile data in said third database.

203. The method of claim 160, further comprising the steps of:
 generating a plurality of data display records for each of said plurality of data providers, each data display record containing said profile data, said location ID and said single data provider ID, and said display date and said display time associated with said single data provider ID; and
 storing said plurality of data display records for said each of said plurality of data providers in said database.

204. The method of claim 203, wherein said database comprises at least first, second and third databases; wherein the method of storing profile data stores said profile data in said first database; wherein the method of storing a plurality of information stores said plurality of information in said second database; wherein the method of storing said data provider ID in said third database; wherein the method of storing said display date and said display time stores said display date and said display time in said third database; wherein the method of storing said location ID stores said location ID in said third database; and wherein the method of storing said plurality of data display records stores said plurality of data display records in said third database.

205. The method of claim 160, wherein said location ID includes a zip code; wherein said associated processing device includes a storage device; and the method further comprising the steps of:
 generating a plurality of data display records for each of said plurality of data providers, each data display record containing said profile data, said location ID and said single data provider ID, and said display date and said display time associated with said single data provider ID;
 storing said plurality of data display records for said each of said plurality of data providers in said storage device of said associated processing device; and
 transmitting said plurality of data display records for said each of said plurality of data providers to said database.

206. The method of claim 151, wherein the step of selecting includes the step of displaying said additional information in said second portion of said monitor.

207. The method of claim 151, wherein the step of selecting includes the steps of:
 displaying a request for additional data to said each subscriber in said second portion of said monitor;
 entering said additional data on said input device by said each subscriber;
 reading said profile data corresponding to said subscriber ID from said database;
 generating a packet containing said subscriber ID, said profile data and said additional data; and
 storing said packet in said database.

208. A system for delivering information to subscribers on a communication network, comprising:
 a plurality of data providers connected to said network;
 a plurality of INFO sources connected to said network for providing a sequence of information, each information uniquely identified by an INFO ID; and
 a plurality of processing devices connected to said network, each uniquely associated with a subscriber to provide an associated processing device and having a receiver for receiving a sequence of INFO IDs from said plurality of INFO sources, a device for reading said sequence of information from said plurality of INFO sources in accordance with said sequence of INFO IDs, a selector for selecting at least one data provider by said subscriber and a display device for continuously displaying said sequence of information simultaneously with said data received from said at least one data provider selected by said subscriber such that said sequence of information and said data requested by said subscriber are simultaneously viewable, and wherein said data to be displayed on said display device is selectable by said subscriber, the display of said sequence of information on said display device is not controllable by said subscriber and does not change in response to the selection of said data by said each subscriber.

209. The system of claim 208, wherein said selector is operable to select another data provider in response to an input from said subscriber and wherein said display device is operable to continuously display said sequence of information simultaneously with data received from said other data provider.

210. The system of claim 208, wherein said display device is operable to continuously display said sequence of information without interfering with the display of said data received from said at least one data provider selected by said subscriber.

211. The system of claim 208, wherein each of said plurality of INFO sources includes a storage device and wherein said receiver includes a reading device for reading information from each storage device to generate said sequence of information.

212. The system of claim 208, further comprising:
 a verifying device for verifying the authorization of said subscriber to determine if said subscriber is authorized to connect to said network; and
 an inhibiting device for inhibiting said displaying device from displaying said sequence of information if it is determined that said subscriber is not authorized to connect to said network.

213. The system of claim 212, wherein said inhibiting device is operable to inhibit said display device from displaying said data received from said at least one data provider selected by said subscriber if it is determined that said subscriber is not authorized to connect to said network.

214. The system of claim 208, further comprising:
a device for verifying the authorization of said subscriber to determine if said subscriber is authorized to connect to said network; and
an inhibiting device for inhibiting said display device from displaying said data received from said at least one data provider selected by said subscriber if it is determined that said subscriber is not authorized to connect to said network.

215. The system of claim 208, wherein said sequence of information contains a sequence of advertisements.

216. The system of claim 208, wherein said sequence of information contains a sequence of messages or announcements.

217. The system of claim 208, wherein said sequence of information contains a sequence of news.

218. The system of claim 208, wherein said sequence of information contains a sequence of updates.

219. The system of claim 208, wherein said sequence of information contains a sequence of advertisements, messages or announcements, news and updates.

220. The system of claim 208, wherein the information comprises texts.

221. The system of claim 208, wherein the information comprises still pictures.

222. The system of claim 208, wherein the information comprises moving pictures.

223. The system of claim 208, wherein the information comprises a video and audio component.

224. The system of claim 208, wherein the information is a combination of text, still pictures and moving pictures.

225. The system of claim 213, wherein said network is a computer network and said associated processing device is a terminal.

226. The system of claim 225, further comprising:
a device for assigning a unique subscriber ID and a password to said subscriber on said communication network; and
a storage device for storing said subscriber ID and said password for said subscriber.

227. The system of claim 226, wherein said terminal includes a connecting device for establishing a connection between said terminal and said computer network.

228. The system of claim 227, wherein said terminal further includes an input device for entering a subscriber ID and a password by said subscriber to initiate a connection between said terminal and said communication network and a transmitter for transmitting said subscriber ID and said password entered on said input device to said storage device for verification;
the system further comprising a device for determining whether said subscriber ID entered on said input device matches one of said subscriber IDs stored in said storage device to provide a verified subscriber ID;
wherein said verifying device is operable to verify said password entered on said input device matches said password associated with said verified subscriber ID if said verified subscriber ID is found; and
wherein said connecting device is operable to connect said terminal associated with said subscriber to said computer network if it is determined that said password entered on said input device matches a password stored in said storage device which is associated with said verified subscriber ID.

229. The system of claim 210, wherein said network is a computer network and said associated processing device is a terminal.

230. The system of claim 229, wherein each of said plurality of data providers is a server on said computer network and wherein said selector is operable to select data to be displayed from said at least one data provider by said subscriber.

231. The system of claim 230, wherein said selector includes:
an input device for entering a request for said data from said at least one server connected to said computer network by said subscriber; and
a transmitter for transmitting said request for said data to said at least one server from said terminal associated with said subscriber.

232. The system of claim 208, wherein said network is a computer network; wherein said receiver is operable for receiving a sequence of addresses from an INFO address provider connected to said network, each address indicating the location of one of said sequence of information in said plurality of INFO sources; and wherein said device for reading reads said sequence of information from said plurality of INFO sources in accordance with said sequence of addresses.

233. The system of claim 213, further comprising:
a device for assigning an unique subscriber ID to each of said plurality of processing devices;
a time device for generating a login time and a login date for said subscriber if it is determined that said subscriber is authorized to connect to said network; and
a storage device connected to said network for storing said subscriber ID, said login time and said login date for said subscriber if it is determined that said subscriber is authorized to connect said network.

234. The system of claim 233, wherein said time device is located within said associated processing device, operable to receive a virtual date and a virtual time from a source connected to said network and operable to generate said login time and said login date for said subscriber as a function of said virtual time and said virtual date, respectively.

235. The system of claim 233, further comprising a disconnect device for determining whether said associated processing device is no longer connected to said network; and wherein said time device is operable to generate a logout time and a logout date for said subscriber if it is determined that said associated processing device is no longer connected to said network; and wherein said storage device is operable to store said logout time and said logout date for said subscriber if it is determined that said associated processing device is no longer connected to said network.

236. The system of claim 235, wherein said disconnect device is operable to generate a session duration for said subscriber as a function of said login time, said login date, said logout date and said logout time; and wherein said storage device is operable to store said session duration for said subscriber.

237. The system of claim 236, wherein said disconnect device is operable to generate a session usage record for said subscriber containing said subscriber ID, said login time, said login date, said logout date, said logout time and said session duration; and wherein said storage device is operable to store said session usage record.

238. A system for delivering information to subscribers on a communication network, comprising:

a plurality of data providers connected to said network;

a plurality of INFO sources connected to said network for providing a sequence of information;

a device for assigning an unique INFO ID and an INFO duration to each information from said plurality of INFO sources to provide a plurality of INFO IDs and a plurality of INFO durations;

a storage device connected to said network for storing said plurality of INFO IDs and said plurality of INFO durations; and a plurality of processing devices connected to said network, each uniquely associated with a subscriber to provide an associated processing device and having a receiver for receiving said sequence of information from said plurality of INFO sources, a selector for selecting at least one data provider by said subscriber and a display device for continuously displaying said sequence of information simultaneously with said data received from said at least one data provider selected by said subscriber such that said sequence of information and said data requested by said subscriber are simultaneously viewable, and wherein said data to be displayed on said display device is selectable by said subscriber, the display of said sequence of information on said display device is not controllable by said subscriber and said each information in said sequence of information is displayed for said INFO duration assigned to said each information before displaying next information in said sequence of information.

239. The system of claim 234, further comprising a disconnect device for determining whether said associated processing device is no longer connected to said network; and wherein said time device is operable to generate a logout time and a logout date for said subscriber if it is determined that said associated processing device is no longer connected to said network; and wherein said storage device is operable to store said logout time and said logout date for said subscriber if it is determined that said associated processing device is no longer connected to said network.

240. The system of claim 239, wherein said disconnect device is operable to generate a session duration for said subscriber as a function of said login time, said login date, said logout date and said logout time; and wherein said storage device is operable to store said session duration for said subscriber.

241. The system of claim 240, wherein said disconnect device is operable to generate a session usage record for said subscriber containing said subscriber ID, said login time, said login date, said logout date, said logout time and said session duration; and wherein said storage device is operable to store said session usage record.

242. The system of claim 235, further comprising a device for assigning an INFO duration to each information in said sequence of information to provide a plurality of INFO durations; wherein said storage device is operable to store said plurality of INFO IDs and said plurality of INFO durations; and wherein said display device is operable to display said each information in said sequence of information for said INFO duration assigned to said each information before displaying next information in said sequence of information.

243. The system of claim 242, wherein said associated processing device includes a device for determining which information in said sequence of information was displayed on said associated processing device as a function of said login time, said login date, said logout date, said logout time and said plurality of INFO durations to provide a list of displayed information for said subscriber; and wherein said storage device is operable to store said list of displayed information for said subscriber.

244. The system of claim 243, wherein said list of displayed information for said subscriber contains a list of INFO IDs corresponding to the displayed information.

245. The system of claim 244, wherein said associated processing device further includes a device for determining date and time that each INFO ID in said list of displayed information was displayed on said associated processing device as a function of said login time, said login date, said logout time, said logout date and said plurality of INFO durations to provide a display date and a display time for said each INFO ID in said list of displayed information for said subscriber; and wherein said storage device is operable to store said display date and said display time for said each INFO ID in said list of displayed information for said subscriber.

246. The system of claim 245, wherein said associated processing device includes a device for generating an INFO display record for each INFO ID in said list of displayed information for said subscriber, said INFO display record containing an INFO ID, said subscriber ID of said subscriber, and said display date, said display time and said INFO duration associated with said INFO ID; and wherein said storage device is operable to store said INFO display record.

247. The system of claim 239, further comprising a device for assigning an INFO duration to each information in said sequence of information to provide a plurality of INFO durations; wherein said storage device is operable to store said plurality of INFO IDs and said plurality of INFO durations; and wherein said display device is operable to display said each information in said sequence of information for said INFO duration assigned to said each information before displaying next information in said sequence of information.

248. The system of claim 247, wherein said associated processing device includes a device for determining which information in said sequence of information was displayed on said associated processing device as a function of said login time, said login date, said logout date, said logout time and said plurality of INFO durations to provide a list of displayed information for said subscriber; and wherein said storage device is operable to store said list of displayed information for said subscriber.

249. The system of claim 248, wherein said list of displayed information for said subscriber contains a list of INFO IDs corresponding to the displayed information.

250. The system of claim 249, wherein said associated processing device further includes a device for determining date and time that each INFO ID in said list of displayed information was displayed on said associated processing device as a function of said login time, said login date, said logout time, said logout date and said plurality of INFO durations to provide a display date and a display time for said each INFO ID in said list of displayed information for said subscriber; and wherein said storage device is operable to store said display date and said display time for said each INFO ID in said list of displayed information for said subscriber.

251. The system of claim 250, wherein said associated processing device includes a device for generating an INFO display record for each INFO ID in said list of displayed information for said subscriber, said INFO display record containing an INFO ID, said subscriber ID of said subscriber, and said display date, said display time and said INFO duration associated with said INFO ID; and wherein said storage device is operable to store said INFO display record.

252. The system of claim 245, further comprising a device for assigning a location ID for said subscriber in accordance with the locality of said associated processing device; and wherein said storage device is operable to store said location ID for said subscriber.

253. The system of claim 252, wherein said location ID includes a zip code; and wherein said associated processing device includes:
- a device for generating an INFO display record for each INFO ID in said list of displayed information for said subscriber, said INFO display record containing an INFO ID, said subscriber ID and said location ID of said subscriber, and said display date, said display time and said INFO duration associated with said INFO ID;
- a local storage device for locally storing said INFO display record; and
- a transmitter for transmitting said INFO display record to said storage device connected to said network.

254. The system of claim 252, wherein said associated processing device includes a device for generating an INFO display record for each INFO ID in said list of displayed information for said subscriber, said INFO display record containing an INFO ID, said subscriber ID and said location ID of said subscriber, and said display date, said display time and said INFO duration associated with said INFO ID; and wherein said storage device is operable to store said INFO display record.

255. The system of claim 250, further comprising a device for assigning a location ID for said subscriber in accordance with the locality of said associated processing device; and wherein said storage device is operable to store said location ID for said subscriber.

256. The system of claim 255, wherein said associated processing device includes a device for generating an INFO display record for each INFO ID in said list of displayed information for said subscriber, said INFO display record containing an INFO ID, said subscriber ID and said location ID of said subscriber, and said display date, said display time and said INFO duration associated with said INFO ID; and wherein said storage device is operable to store said INFO display record.

257. The system of claim 255, wherein said location ID includes a zip code; and wherein said associated processing device includes:
- a device for generating an INFO display record for each INFO ID in said list of displayed information for said subscriber, said INFO display record containing an INFO ID, said subscriber ID and said location ID of said subscriber, and said display date, said display time and said INFO duration associated with said INFO ID;
- a local storage device for locally storing said INFO display record; and
- a transmitter for transmitting said INFO display record to said storage device connected to said network.

258. The system of claim 240, further comprising a device for assigning a location ID for said subscriber in accordance with the locality of said associated processing device; and wherein said storage device is operable to store said location ID for said subscriber.

259. The system of claim 258, wherein said location ID includes a zip code.

260. The system of claim 258, wherein said disconnect device is operable to generate a session usage record for said subscriber containing said subscriber ID, said login time, said login date, said logout date, said logout time, said session duration and said location ID; and wherein said storage device is operable to store said session usage record.

261. The system of claim 236, further comprising a device for assigning a location ID for said subscriber in accordance with the locality of said associated processing device; and wherein said storage device is operable to store said location ID for said subscriber.

262. The system of claim 261, wherein said location ID includes a zip code.

263. The system of claim 261, wherein said disconnect device is operable to generate a session usage record for said subscriber containing said subscriber ID, said login time, said login date, said logout date, said logout time, said session duration and said location ID; and wherein said storage device is operable to store said session usage record.

264. A system for delivering information to subscribers on a communication network, comprising:
- a plurality of data providers connected to said network;
- a plurality of INFO sources connected to said network for providing a sequence of information;
- a verifying device for verifying the authorization of said subscriber to determine if said subscriber is authorized to connect to said network;
- a plurality of processing devices connected to said network, each uniquely associated with a subscriber to provide an associated processing device and having a receiver for receiving said sequence of information from said plurality of INFO sources, a selector for selecting at least one data provider by said subscriber and a display device for continuously displaying said sequence of information simultaneously with said data received from said at least one data provider selected by said subscriber if it is determined that said subscriber is authorized to connect to said network, such that said sequence of information and said data requested by said subscriber are simultaneously viewable, and wherein said data to be displayed on said display device is selectable by said subscriber and the display of said sequence of information on said display device is not controllable by said subscriber;
- a device for assigning an unique subscriber ID to each of said plurality of processing devices;
- a device for generating a ping signal every predetermined interval if it is determined that said subscriber is authorized to connect to said network; and
- a transmitter for transmitting said ping signal to said storage device;
- a time device for generating a login time and a login date for said subscriber if it is determined that said subscriber is authorized to connect to said network and for generating a logout time and a logout date for said subscriber when said ping signal is not received from said associated processing device substantially within said expected time; and
- a storage device connected to said network for storing said subscriber ID, said login time, said login date, said logout time and said logout date for said subscriber if it is determined that said subscriber is authorized to connect said network and for updating an expected time of next ping signal from said subscriber.

265. The system of claim 239, wherein said associated processing device further includes:

a device for generating a ping signal every predetermined interval if it is determined that said subscriber is authorized to connect to said network; and a transmitter for transmitting said ping signal to said storage device; and wherein said storage device is operable to update an expected time of next ping signal from said subscriber; and wherein said time device is operable to generate said logout time and said logout date for said subscriber when said ping signal is not received from said associated processing device substantially within said expected time.

266. The system of claim 238, wherein said associated processing device includes a device for determining date and time that each information in said sequence of information is displayed on said associated processing device to provide a display date and a display time, respectively; and wherein said storage device is operable to store said display date and said display time for said each information for said subscriber.

267. The system of claim 266, wherein said associated processing device includes a device for generating a plurality of INFO display records for said subscriber, each INFO display record containing subscriber ID of said subscriber, and said INFO ID, said display date, said display time and said INFO duration associated with said each information; and wherein said storage device is operable to store said plurality of INFO display records.

268. The system of claim 266, further comprising a device for assigning a location ID for said subscriber in accordance with the locality of said associated processing device; and wherein said storage device is operable to store said location ID for said subscriber.

269. The system of claim 268, wherein said location ID includes a zip code; and wherein said associated processing device includes:

a device for generating a plurality of INFO display records for said subscriber, each INFO display record containing subscriber ID and location ID of said subscriber, and said INFO ID, said display date, said display time and said INFO duration associated with said each information;

a local storage device for locally storing said plurality of display records; and a transmitter for transmitting said plurality of INFO display records to said storage device connected to said network.

270. The system of claim 268, wherein said associated processing device includes a device for generating a plurality of INFO display records for said subscriber, each INFO display record containing subscriber ID and location ID of said subscriber, and said INFO ID, said display date, said display time and said INFO duration associated with said each information; and wherein said storage device is operable to store said plurality of INFO display records.

271. The system of claim 210, wherein said associated processing device includes an input device; and wherein said display devices includes a first portion for displaying said sequence of information and a second portion for displaying said data received from said at least one data provider selected by said subscriber.

272. The system of claim 271, further comprising:

a device for assigning an INFO duration to each information in said sequence of information to provide a plurality of INFO durations; and a storage device connected to said network for storing said plurality of INFO IDs and said plurality of INFO durations; and wherein said display device is operable to display said each information in said sequence of information for said INFO duration assigned to said each information before displaying next information in said sequence of information for said subscriber.

273. The system of claim 272, wherein said first portion of said display device is divided into a plurality of linked regions and a plurality of unlinked regions, each of said plurality of linked regions is linked to one of said plurality of data providers; and wherein said associated processing device further includes a region selector for selecting one of said plurality of linked regions by said each subscriber to receive additional information.

274. The system of claim 273, further comprising a device for assigning an unique subscriber ID to said associated processing device; wherein each of said plurality of data providers is uniquely identified by a data provider ID; and wherein said associated processing device further includes:

a detector for detecting which information in said sequence of information is being displayed on said first portion of said display device to provide a displayed INFO ID; and a time device for determining date and time that information corresponding to said displayed INFO ID was displayed on said associated processing device to provide a display date and a display time, respectively; and wherein said detector is operable to detect which one of said plurality of linked regions was selected by said subscriber during the display of information corresponding to said displayed INFO ID to provide a selected data provider ID; and wherein said storing device is operable to store said subscriber ID, said displayed INFO ID, said selected data provider ID, said display date and said display time for said subscriber if it is detected that said one of said plurality of linked regions was selected by said subscriber.

275. The system of claim 274, further comprising a device for assigning a location ID for said subscriber in accordance with the locality of said associated processing device; and wherein said storage device is operable to store said location ID for said subscriber.

276. The system of claim 275, wherein said location ID includes a zip code; and wherein said associated processing device further includes:

a device for generating a plurality of clicked event records for said subscriber, each clicked event record for said subscriber being associated with a single selected data provider ID and said each clicked event record containing said subscriber ID, said location ID and said single selected data provider ID, and said displayed INFO ID, said display date and said display time associated with said single selected data provider ID;

a local storage device for locally storing said plurality of clicked event records for said subscriber; and a transmitter for said plurality of clicked event records for said subscriber to said storage device connected to said network.

277. The system of claim 275, wherein said associated processing device further includes a device for generating a plurality of clicked event records for said subscriber, each clicked event record for said subscriber being associated with a single selected data provider ID and said each clicked event record containing said subscriber ID, said location ID and said single selected data provider ID, and said displayed INFO ID, said display date and said display time associated with said single selected data provider ID; and wherein said storage device is operable to store said plurality of clicked event records for said subscriber.

278. The system of claim 208, wherein each information in said sequence of information for said subscriber is a unsolicited request for data from one of said plurality of data providers.

279. The system of claim 278, wherein said unsolicited request for data is limited to a subset of said plurality of data providers.

280. The system of claim 279, further comprising an inhibiting device for inhibiting said selector from selecting a data provider in said subset by said subscriber.

281. The system of claim 208, wherein each of said plurality of data providers is uniquely identified by a data provider ID and further comprising a storage device connected to said network for storing said subscriber ID and said data provider ID associated with at least one data provider selected by said subscriber.

282. The system of claim 281, wherein said associated processing device further includes a time device for determining date and time said data received from said at least one data provider selected by said subscriber was displayed on said display device to provide a display date and a display time, respectively; and wherein said storage device is operable to store said display date and said display time.

283. The system of claim 282, further comprising a device for assigning a location ID for said subscriber in accordance with the locality of said associated processing device; and wherein said storage device is operable to store said location ID for said subscriber.

284. The system of claim 283, wherein said location ID includes a zip code; and wherein said associated processing device further includes:
  a device for generating a plurality of data display records for said subscriber, each data display record for said subscriber being associated with a single data provider ID stored in said storage device and said each data display record containing said subscriber ID, said location ID and said single data provider ID, and said display date and said display time associated with said single data provider ID;
  a local storage device for locally storing said plurality of data display records for said subscriber; and
  a transmitter for transmitting said plurality of data display records for said subscriber to said storage device connected to said network.

285. The system of claim 283, wherein said associated processing device further includes a device for generating a plurality of data display records for said subscriber, each data display record for said subscriber being associated with a single data provider ID stored in said storage device and said each data display record containing said subscriber ID, said location ID and said single data provider ID, and said display date and said display time associated with said single data provider ID; and wherein said storage device is operable to store said plurality of data display records for said subscriber.

286. The system of claim 209, wherein said network is a cable television network and wherein said plurality of processing devices are converter boxes.

287. The system of claim 286, wherein said each of said plurality of data providers represents a broadcast channel on said cable television network.

288. The system of claim 287, wherein each of said converter boxes includes a television receiving apparatus, wherein said selector is operable to select a broadcast channel to display a program that is received on said selected broadcast channel and wherein said display device is operable to continuously display said sequence of information simultaneously with said program received on said selected broadcast channel.

289. The system of claim 288, wherein said selector is operable to select a next broadcast channel to display a program that is received on said next broadcast channel in response to said input from said subscriber and wherein said display device is operable to continuously display said sequence of information simultaneously with said program received on said next broadcast channel.

290. The system of claim 289, wherein said selector includes a channel up button or a channel down button operable with said convertor box.

291. The system of claim 274, wherein said region selector is operable to control said display device to display said additional information in said second portion of said display device.

292. The system of claim 274, wherein said region selector is operable to control said display device to display a request for additional data to said subscriber in said second portion of said display device; wherein said input device is operable to enter said additional data by said subscriber; and wherein said storage device is operable to store said additional data.

293. A system for selectively delivering information to subscribers on a communication network, comprising:
  a plurality of data providers connected to said network;
  a storage device connected to said network for storing profile data of each subscriber and a plurality of information received from a plurality of INFO sources connected to said network, each information uniquely identified by an INFO ID;
  an INFO selector for selecting a sequence of INFO IDs for said each subscriber from said plurality of information in accordance with said profile data of said each subscriber; and
  a plurality of processing devices connected to said network, each uniquely associated with a subscriber to provide an associated processing device and having a receiver for receiving said sequence of INFO IDs for said subscriber from said INFO selector, a device for reading a sequence of information from said plurality of INFO sources in accordance with said sequence of INFO IDs, a data selector for selecting at least one data provider by said subscriber and a display device for continuously displaying said sequence of information for said subscriber simultaneously with said data received from said at least one data provider selected by said subscriber such that said sequence of information for said subscriber and said data requested by said subscriber are simultaneously viewable, and wherein said data to be displayed on said display device is selectable by said subscriber, the display of said sequence of information for said subscriber is not controllable by said subscriber and does not change in response to the selection of said data by said each subscriber.

294. The system of claim 293, wherein said data selector is operable to select another data provider in response to an input from said subscriber and wherein said display device is operable to continuously display said sequence of information for said subscriber simultaneously with data received from said other data provider.

295. The system of claim 293, wherein said display device is operable to continuously display said sequence of information for said subscriber without interfering with the display of said data received from said at least one data provider selected by said subscriber.

296. The system of claim 293, wherein each of said plurality of INFO sources includes an INFO database and further comprising a device for retrieving information from each INFO database to generate said plurality of information.

297. The system of claim 293, further comprising:
a verifying device for verifying the authorization of said subscriber to determine if said subscriber is authorized to connect to said network; and
an inhibiting device for inhibiting said display device from displaying said sequence of information for said subscriber if it is determined that said subscriber is not authorized to connect to said network.

298. The system of claim 297, wherein said inhibiting device is operable to inhibit said display device from displaying said data received from said at least one data provider selected by said subscriber if it is determined that said subscriber is not authorized to connect to said network.

299. The system of claim 293, further comprising:
a device for verifying the authorization of said subscriber to determine if said subscriber is authorized to connect to said network; and
an inhibiting device for inhibiting said display device from displaying said data received from said at least one data provider selected by said subscriber if it is determined that said subscriber is not authorized to connect to said network.

300. The system of claim 293, wherein said sequence of information contains a sequence of advertisements.

301. The system of claim 293, wherein said sequence of information contains a sequence of messages or announcements.

302. The system of claim 293, wherein said sequence of information contains a sequence of news.

303. The system of claim 293, wherein said sequence of information contains a sequence of updates.

304. The system of claim 293, wherein said sequence of information contains a sequence of advertisements, messages or announcements, news and updates.

305. The system of claim 293, wherein the information comprises texts.

306. The system of claim 293, wherein the information comprises still pictures.

307. The system of claim 293, wherein the information comprises moving pictures.

308. The system of claim 293, wherein the information comprises a video and audio component.

309. The system of claim 293, wherein the information is a combination of text, still pictures and moving pictures.

310. The system of claim 298, wherein said network is a computer network and said associated processing device is a terminal.

311. The system of claim 310, further comprising a device for assigning a unique subscriber ID and a password to said subscriber on said communication network; and wherein said storage device is operable to store said subscriber ID and said password for said subscriber.

312. The system of claim 311, wherein said terminal includes a connecting device for establishing a connection between said terminal and said computer network.

313. The system of claim 312, wherein said terminal further includes an input device for entering a subscriber ID and a password by said subscriber to initiate a connection between said terminal and said communication network and a transmitter for transmitting said subscriber ID and said password entered on said input device to said storage device for verification;
the system further comprising a device for determining whether said subscriber ID entered on said input device matches one of said subscriber IDs stored in said storage device to provide a verified subscriber ID;
wherein said verifying device is operable to verify said password entered on said input device matches said password associated with said verified subscriber ID if said verified subscriber ID is found; and
wherein said connecting device is operable to connect said terminal associated with said subscriber to said computer network if it is determined that said password entered on said input device matches a password stored in said database which is associated with said verified subscriber ID.

314. The system of claim 295, wherein said network is a computer network and said associated processing device is a terminal.

315. The system of claim 314, wherein each of said plurality of data providers is a server on said computer network and wherein said data selector is operable to select data to be displayed from said at least one data provider by said subscriber.

316. The system of claim 315, wherein said selector includes:
an input device for entering a request for said data from said at least one server connected to said computer network by said subscriber; and
a transmitter for transmitting said request for said data to said at least one server from said terminal associated with said subscriber.

317. The system of claim 293, wherein said network is a computer network and wherein said receiver is operable for receiving a sequence of addresses from said storage device, each address indicating the location of one of said sequence of information in said plurality of INFO sources; and wherein said device for reading reads said sequence of information from said plurality of INFO sources in accordance with said sequence of addresses.

318. The system of claim 298, further comprising:
a device for assigning an unique subscriber ID to each of said plurality of processing devices;
a time device for generating a login time and a login date for said subscriber if it is determined that said subscriber is authorized to connect to said network; and
wherein said storage device is operable to store said subscriber ID, said login time and said login date for said subscriber in said database if it is determined that said each subscriber is authorized to connect said network.

319. The system of claim 318, wherein said time device is located within said associated processing device, operable to receive a virtual date and a virtual time from a source connected to said network and operable to generate said login time and said login date for said subscriber as a function of said virtual time and said virtual date, respectively.

320. The system of claim 318, further comprising a disconnect device for determining whether said associated processing device is no longer connected to said network; and wherein said time device is operable to generate a logout time and a logout date for said subscriber if it is determined that said associated processing device is no longer connected to said network; and wherein said storage device is operable to store said logout time and said logout date for said subscriber if it is determined that said associated processing device is no longer connected to said network.

321. The system of claim 320, wherein said disconnect device is operable to generate a session duration for said subscriber as a function of said login time, said login date, said logout date and said logout time; and wherein said storage device is operable to store said session duration for said subscriber.

322. The system of claim 321, wherein said disconnect device is operable to generate a session usage record for said subscriber containing said subscriber ID, said login time, said login date, said logout date, said logout time and said session duration; and wherein said storage device is operable to store said session usage record.

323. A system for selectively delivering information to subscribers on a communication network, comprising:

a plurality of data providers connected to said network;

a device for assigning an unique INFO ID and an INFO duration to each information in a plurality of information received from a plurality of INFO sources connected to said network to provide a plurality of INFO IDs and a plurality of INFO durations;

a storage device connected to said network for storing profile data of each subscriber, said plurality of information, said plurality of INFO IDs and said plurality of INFO durations;

an INFO selector for selecting a sequence of information for said each subscriber from said plurality of information in accordance with said profile data of said each subscriber;

a plurality of processing devices connected to said network, each uniquely associated with a subscriber to provide an associated processing device and having a receiver for receiving said sequence of information for said subscriber from said INFO selector, a data selector for selecting at least one data provider by said subscriber and a display device for continuously displaying said sequence of information for said subscriber simultaneously with said data received from said at least one data provider selected by said subscriber such that said sequence of information for said subscriber and said data requested by said subscriber are simultaneously viewable, and wherein said data to be displayed on said display device is selectable by said subscriber, the display of said sequence of information for said subscriber is not controllable by said subscriber and said each information in said sequence of information is displayed for said INFO duration assigned to said each information before displaying next information in said sequence of information for said subscriber.

324. The system of claim 319, further comprising a disconnect device for determining whether said associated processing device is no longer connected to said network; and wherein said time device is operable to generate a logout time and a logout date for said subscriber if it is determined that said associated processing device is no longer connected to said network; and wherein said storage device is operable to store said logout time and said logout date for said subscriber if it is determined that said associated processing device is no longer connected to said network.

325. The system of claim 324, wherein said disconnect device is operable to generate a session duration for said subscriber as a function of said login time, said login date, said logout date and said logout time; and wherein said storage device is operable to store said session duration for said subscriber.

326. The system of claim 325, wherein said disconnect device is operable to generate a session usage record for said subscriber containing said subscriber ID, said login time, said login date, said logout date, said logout time and said session duration; and wherein said storage device is operable to store said session usage record.

327. The system of claim 320, further comprising a device for assigning an INFO duration to each information in said plurality of information to provide a plurality of INFO durations; wherein said storage device is operable to store said plurality of INFO IDs and said plurality of INFO durations; and wherein said display device is operable to display said each information in said sequence of information for said INFO duration assigned to said each information before displaying next information in said sequence of information for said subscriber.

328. The system of claim 327, wherein said associated processing device includes a device for determining which information in said sequence of information for said subscriber was displayed on said associated processing device as a function of said login time, said login date, said logout date, said logout time and said plurality of INFO durations to provide a list of displayed information for said subscriber; and wherein said storage device is operable to store said list of displayed information for said subscriber.

329. The system of claim 328, wherein said list of displayed information for said subscriber contains a list of INFO IDs corresponding to the displayed information.

330. The system of claim 329, wherein said associated processing device further includes a device for determining date and time that each INFO ID in said list of displayed information was displayed on said associated processing device as a function of said login time, said login date, said logout time, said logout date and said INFO durations assigned to each information in said sequence of information for said subscriber to provide a display date and a display time for said each INFO ID in said list of displayed information for said subscriber; and wherein said storage device is operable to store said display date and said display time for said each INFO ID in said list of displayed information for said subscriber.

331. The system of claim 330, wherein said associated processing device includes a device for generating an INFO display record for each INFO ID in said list of displayed information for said subscriber, said INFO display record containing an INFO ID and said subscriber ID of said subscriber, and said display date, said display time and said INFO duration associated with said INFO ID; and wherein said storage device is operable to store said INFO display record in said database.

332. The system of claim 324, further comprising a device for assigning an INFO duration to each information in said plurality of information to provide a plurality of INFO durations; wherein said storage device is operable to store said plurality of INFO IDs and said plurality of INFO durations; and wherein said display device is operable to display said each information in said sequence of information for said INFO duration assigned to said each information before displaying next information in said sequence of information for said subscriber.

333. The system of claim 332, wherein said associated processing device further includes a device for determining which information in said sequence of information for said subscriber was displayed on said associated processing device as a function of said login time, said login date, said logout date, said logout time and said INFO duration assigned to each information in said sequence of information for said subscriber to provide a list of display information for said subscriber; and wherein said storage device is operable to store said list of displayed information for said subscriber.

334. The system of claim 333, wherein said list of displayed information for said subscriber contains a list of INFO IDs corresponding to the displayed information.

335. The system of claim 334, wherein said associated processing device further includes a device for determining date and time that each INFO ID in said list of displayed information was displayed on said associated processing device as a function of said login time, said login date, said logout time, said logout date and said INFO duration assigned to each information in said sequence of information for said subscriber to provide a display date and a display time for said each INFO ID in said list of displayed information for said subscriber; and wherein said storage device is operable to store said display date and said display time for said each INFO ID in said list of displayed information for said subscriber.

336. The system of claim 335, wherein said associated processing device further includes a device for generating an INFO display record for each INFO ID in said list of displayed information for said subscriber, said INFO display record containing an INFO ID, said subscriber ID of said subscriber, and said display date, said display time and said INFO duration associated with said INFO ID; and wherein said storage device is operable to store said INFO display record.

337. The system of claim 330, further comprising a device for assigning a location ID for said subscriber in accordance with the locality of said associated processing device; and wherein said storage device is operable to store said location ID for said subscriber.

338. The system of claim 337, wherein said location ID includes a zip code; and wherein said associated processing device includes:
  a device for generating an INFO display record for each INFO ID in said list of displayed information for said subscriber, said INFO display record containing an INFO ID, said subscriber ID and said location ID of said subscriber, and said display date, said display time and said INFO duration associated with said INFO ID;
  a local storage device for locally storing said INFO display record; and
  a transmitter for transmitting said INFO display record to said storage device connected to said network.

339. The system of claim 337, wherein said associated processing device includes a device for generating an INFO display record for each INFO ID in said list of displayed information for said subscriber, said INFO display record containing an INFO ID, said subscriber ID and said location ID of said subscriber, and said display date, said display time and said INFO duration associated with said INFO ID; and wherein said storage device is operable to store said INFO display record.

340. The system of claim 335, further comprising a device for assigning a location ID for said subscriber in accordance with the locality of said associated processing device; and wherein said storage device is operable to store said location ID for said subscriber.

341. The system of claim 340, wherein said associated processing device further includes a device for generating an INFO display record for each INFO ID in said list of displayed information for said subscriber, said INFO display record containing an INFO ID, said subscriber ID and said location ID of said subscriber, and said display date, said display time and said INFO duration associated with said INFO ID; and wherein said storage device is operable to store said INFO display record.

342. The system of claim 340, wherein said location ID includes a zip code; and wherein said associated processing device further includes:
  a device for generating an INFO display record for each INFO ID in said list of displayed information for said subscriber, said INFO display record containing an INFO ID, said subscriber ID and said location ID of said subscriber, and said display date, said display time and said INFO duration associated with said INFO ID;
  a local storage device for locally storing said INFO display record; and
  a transmitter for transmitting said INFO display record to said storage device connected to said network.

343. The system of claim 325, further comprising a device for assigning a location ID for said subscriber in accordance with the locality of said associated processing device; and wherein said storage device is operable to store said location ID for said subscriber.

344. The system of claim 343, wherein said location ID includes a zip code.

345. The system of claim 343, wherein said disconnect device is operable to generate a session usage record for said subscriber containing said subscriber ID, said login time, said login date, said logout date, said logout time, said session duration and said location ID; and wherein said storage device is operable to store said session usage record for said subscriber.

346. The system of claim 321, further comprising a device for assigning a location ID for said subscriber in accordance with the locality of said associated processing device; and wherein said storage device is operable to store said location ID for said subscriber.

347. The system of claim 346, wherein said location ID includes a zip code.

348. The system of claim 346, wherein said disconnect device is operable to generate a session usage record for said subscriber containing said subscriber ID, said login time, said login date, said logout date, said logout time, said session duration and said location ID; and wherein said storage device is operable to store said session usage record for said subscriber.

349. A system for selectively delivering information to subscribers on a communication network, comprising:
  a plurality of data providers connected to said network;
  a storage device connected to said network for storing profile data of each subscriber and a plurality of information received from a plurality of INFO sources connected to said network;
  an INFO selector for selecting a sequence of information for said each subscriber from said plurality of information in accordance with said profile data of said each subscriber;
  a verifying device for verifying the authorization of a subscriber to determine if said subscriber is authorized to connect to said network;
  a plurality of processing devices connected to said network, each uniquely associated with a subscriber to provide an associated processing device and having a receiver for receiving said sequence of information for said subscriber from said INFO selector, a data selector for selecting at least one data provider by said subscriber and a display device for continuously displaying said sequence of information for said subscriber simultaneously with said data received from said at least one data provider selected by said subscriber if it is determined that said subscriber is authorized to connect to said network, such that said sequence of information for said subscriber and said data requested by said subscriber are simultaneously viewable, and wherein said data to be displayed on said display device is selectable by said subscriber and the display of said sequence of information for said subscriber is not controllable by said subscriber;

a device for assigning an unique subscriber ID to each of said plurality of processing devices;

a device for generating a ping signal every predetermined interval if it is determined that said subscriber is authorized to connect to said network;

a transmitter for transmitting said ping signal to said storage device;

a time device for generating a login time and a login date for said subscriber if it is determined that said subscriber is authorized to connect to said network and for generating a logout time and a logout date for said subscriber when said ping signal is not received from said associated processing device substantially within said expected time; and wherein said storage device is operable to store said subscriber ID, said login time, said login date, said logout time, said logout date for said subscriber in said database if it is determined that said each subscriber is authorized to connect said network and for updating an expected time of next ping signal from said subscriber.

350. The system of claim 324, wherein said associated processing device further includes:

a device for generating a ping signal every predetermined interval if it is determined that said subscriber is authorized to connect to said network; and a transmitter for transmitting said ping signal to said storage device; and wherein said storage device is operable to update an expected time of next ping signal from said subscriber; and wherein said time device is operable to generate said logout time and said logout date for said subscriber when said ping signal is not received from said associated processing device substantially within said expected time.

351. The system of claim 323, wherein said associated processing device further includes a device for determining date and time that each information in said sequence of information for said subscriber was displayed on said associated processing device to provide a display date and a display time, respectively; and wherein said storage device is operable to store said display date and said display time of said each information for said subscriber.

352. The system of claim 351, wherein said associated processing device further includes a device for generating a plurality of INFO display records for said subscriber, each INFO display record containing subscriber ID of said subscriber, and said INFO ID, said display date, said display time and said INFO duration associated with said each information; and wherein said storage device is operable to store said plurality of INFO display records.

353. The system of claim 351, further comprising a device for assigning a location ID for said subscriber in accordance with the locality of said associated processing device; and wherein said storage device is operable to store said location ID for said subscriber.

354. The system of claim 353, wherein said location ID includes a zip code; and wherein said associated processing device includes:

a device for generating a plurality of INFO display records for said subscriber, each INFO display record containing subscriber ID and location ID of said subscriber, and said INFO ID, said display date, said display time and said INFO duration associated with said each information;

a storage device for locally storing said plurality of INFO display records for said subscriber; and a transmitter for transmitting said plurality of INFO display records for said subscriber to said storage device connected to said network.

355. The system of claim 353, wherein said associated processing device includes a device for generating a plurality of INFO display records for said subscriber, each INFO display record containing subscriber ID and location ID of said subscriber, and said INFO ID, said display date, said display time and said INFO duration associated with said each information; and wherein said storage device is operable to store said plurality of INFO display records.

356. The system of claim 295, wherein said associated processing device includes an input device; and wherein said display devices includes a first portion for displaying said sequence of information and a second portion for displaying said data received from said at least one data provider selected by said subscriber.

357. The system of claim 356, further comprising a device for assigning an INFO duration to each information in said sequence of information to provide a plurality of INFO durations; wherein said storage device is operable to store said plurality of INFO IDs and said plurality of INFO durations; and wherein said display device is operable to display said each information in said sequence of information for said INFO duration assigned to said each information before displaying next information in said sequence of information for said subscriber.

358. The system of claim 357, wherein said first portion of said display device is divided into a plurality of linked regions and a plurality of unlinked regions, each of said plurality of linked regions is linked to one of said plurality of data providers; and wherein said associated processing device further includes a region selector for selecting one of said plurality of linked regions by said each subscriber to receive additional information.

359. The system of claim 358, further comprising a device for assigning an unique subscriber ID to said associated processing device; wherein each of said plurality of data providers is uniquely identified by a data provider ID; and wherein said associated processing device further includes:

a detector for detecting which information in said sequence of information is being displayed on said first portion of said display device to provide a displayed INFO ID; and a time device for determining date and time that information corresponding to said displayed INFO ID was displayed on said associated processing device to provide a display date and a display time, respectively; and wherein said detector is operable to detect which one of said plurality of linked regions was selected by said subscriber during the display of information corresponding to said displayed INFO ID to provide a selected data provider ID; and wherein said storing device is operable to store said subscriber ID, said displayed INFO ID, said selected data provider ID, said display date and said display time for said subscriber if it is detected that said one of said plurality of linked regions was selected by said subscriber.

360. The system of claim 359, further comprising a device for assigning a location ID for said subscriber in accordance with the locality of said associated processing device; and wherein said storage device is operable to store said location ID for said subscriber.

361. The system of claim 360, wherein said location ID includes a zip code; and wherein said associated processing device further includes:
  a device for generating a plurality of clicked event records for said subscriber, each clicked event record for said subscriber being associated with a single selected data provider ID and said each clicked event record containing said subscriber ID, said location ID and said single selected data provider ID, and said displayed INFO ID, said display date and said display time associated with said single selected data provider ID;
  a local storage device for locally storing said plurality of clicked event records for said subscriber; and
  a transmitter for transmitting said plurality of clicked event records for said subscriber to said storage device connected to said network.

362. The system of claim 360, wherein said associated processing device further includes a device for generating a plurality of clicked event records for said subscriber, each clicked event record for said subscriber being associated with a single selected data provider ID and said each clicked event record containing said subscriber ID, said location ID and said single selected data provider ID, and said displayed INFO ID, said display date and said display time associated with said single selected data provider ID; and wherein said storage device is operable to store said plurality of clicked event records for said subscriber.

363. The system of claim 293, wherein each information in said sequence of information for said subscriber is a unsolicited request for data from one of said plurality of data providers.

364. The system of claim 363, wherein said unsolicited request for data is limited to a subset of said plurality of data providers.

365. The system of claim 364, further comprising an inhibiting device for inhibiting said selector from selecting a data provider in said subset by said subscriber.

366. The system of claim 293, wherein each of said plurality of data providers is uniquely identified by a data provider ID and further comprising a storage device connected to said network for storing said subscriber ID and said data provider ID associated with at least one data provider selected by said subscriber.

367. The system of claim 366, wherein said associated processing device further includes a time device for determining date and time said data received from said at least one data provider selected by said subscriber was displayed on said display device to provide a display date and a display time, respectively; and wherein said storage device is operable to store said display date and said display time.

368. The system of claim 367, further comprising a device for assigning a location ID for said subscriber in accordance with the locality of said associated processing device; and wherein said storage device is operable to store said location ID for said subscriber.

369. The system of claim 368, wherein said location ID includes a zip code; and wherein said associated processing device further includes:

a device for generating a plurality of data display records for said subscriber, each data display record for said subscriber being associated with a single data provider ID stored in said storage device and said each data display record containing said subscriber ID, said location ID and said single data provider ID, and said display date and said display time associated with said single data provider ID;
  a local storage device for locally storing said plurality of data display records for said subscriber; and
  a transmitter for transmitting said plurality of data display records for said subscriber to said storage device connected to said network.

370. The system of claim 368, wherein said associated processing device further includes a device for generating a plurality of data display records for said subscriber, each data display record for said subscriber being associated with a single data provider ID stored in said storage device and said each data display record containing said subscriber ID, said location ID and said single data provider ID, and said display date and said display time associated with said single data provider ID; and wherein said storage device is operable to store said plurality of data display records for said subscriber.

371. The system of claim 294, wherein said network is a cable television network and wherein said plurality of processing devices are converter boxes.

372. The system of claim 371, wherein said each of said plurality of data providers represents a broadcast channel on said cable television network.

373. The system of claim 372, wherein each of said converter boxes includes a television receiving apparatus, wherein said selector is operable to select a broadcast channel to display a program that is received on said selected broadcast channel and wherein said display device is operable to continuously display said sequence of information simultaneously with said program received on said selected broadcast channel.

374. The system of claim 373, wherein said selector is operable to select a next broadcast channel to display a program that is received on said next broadcast channel in response to said input from said subscriber and wherein said display device is operable to continuously display said sequence of information simultaneously with said program received on said next broadcast channel.

375. The system of claim 374, wherein said selector includes a channel up button or a channel down button operable with said convertor box.

376. The system of claim 313, wherein said connecting device includes a phone selector for selecting an access phone number by said subscriber; and wherein said connecting device is operable to connect said terminal to said computer network using said access phone number.

377. The system of claim 376, wherein said INFO selector is operable to select said sequence of information for said subscriber in accordance with said profile data and said access phone number associated with said subscriber.

378. The system of claim 376, further comprising a device for assigning a location ID for said subscriber in accordance with the locality of said associated processing device; and wherein said storage device is operable to store said location ID for said subscriber.

379. The system of claim 378, wherein said location id includes at least a zip code.

380. The system of claim 379, further comprising:
  a device for determining whether said zip code stored for said subscriber is associated with said access phone number selected by said subscriber; and an assigning device for assigning said zip code as a location zip code for said subscriber if it is determined that said zip code is associated with said access phone number; and wherein said assigning device is operable to assign said location zip code for said subscriber in accordance with said access phone number if it is determined that said zip code is not associated with said access phone number.

381. The system of claim 380, wherein said INFO selector is operable to select said sequence of information for said subscriber in accordance with said profile data and said location zip code associated with said subscriber.

382. The system of claim 381, further comprising a device for determining a time zone in accordance with said location zip code.

383. The system of claim 382, further comprising a device for assigning a display time range to each of said plurality of information to provide a plurality of display time ranges; and wherein said storage device is operable to store said plurality of display time ranges.

384. The system of claim 383, wherein said INFO selector is operable to select said sequence of information for said subscriber in accordance with said profile data, said location zip code, a current time and said time zone associated with said subscriber, and said plurality of display time ranges.

385. The system of claim 376, further comprising a device for assigning a display time range to each of said plurality of information to provide a plurality of display time ranges; and wherein said storage device is operable to store said plurality of display time ranges.

386. The system of claim 385, wherein said INFO selector is operable to select said sequence of information for said subscriber in accordance with said profile data, said access phone number and a current time associated with said subscriber, and said plurality of display time ranges.

387. The system of claim 293, wherein said associated processing device includes an input device for entering said profile data by said subscriber; and wherein said storage device is operable to store said profile data entered by said subscriber.

388. The system of claim 387, further comprising a device for assigning an unique subscriber ID to each of said plurality of processing devices; wherein said input device is operable to enter additional profile data by said subscriber; and wherein said storage device is operable to store said subscriber ID and said additional profile data for said subscriber.

389. The system of claim 388, wherein said INFO selector is operable to select said sequence of information for said subscriber in accordance with said profile data and said additional profile data.

390. The system of claim 322, wherein said INFO selector is operable to select said sequence of information for said subscriber in accordance with said profile data and said session usage record.

391. The system of claim 326, wherein said INFO selector is operable to select said sequence of information for said subscriber in accordance with said profile data and said session usage record.

392. The system of claim 345, wherein said INFO selector is operable to select said sequence of information for said subscriber in accordance with said profile data and said session usage record.

393. The system of claim 348, wherein said INFO selector is operable to select said sequence of information for said subscriber in accordance with said profile data and said session usage record.

394. The system of claim 331, wherein said INFO selector is operable to select said sequence of information for said subscriber in accordance with said profile data and said INFO display record.

395. The system of claim 336, wherein said INFO selector is operable to select said sequence of information for said subscriber in accordance with said profile data and said INFO display record.

396. The system of claim 339, wherein said INFO selector is operable to select said sequence of information for said subscriber in accordance with said profile data and said INFO display record.

397. The system of claim 341, wherein said INFO selector is operable to select said sequence of information for said subscriber in accordance with said profile data and said INFO display record.

398. The system of claim 352, wherein said INFO selector is operable to select said sequence of information for said subscriber in accordance with said profile data and said INFO display record.

399. The system of claim 355, wherein said INFO selector is operable to select said sequence of information for said subscriber in accordance with said profile data and said INFO display record.

400. The system of claim 362, wherein said INFO selector is operable to select said sequence of information for said subscriber in accordance with said profile data and said plurality of clicked event records.

401. The system of claim 370, wherein said INFO selector is operable to select said sequence of information for said subscriber in accordance with said profile data and said plurality of data display records.

402. The system of claim 293, wherein said storage device comprises at least a first storage device for storing said profile data and a second storage device for storing said plurality of information.

403. The system of claim 311, wherein said storage device comprises at least a first storage device for storing said profile data, a second storage device for storing said plurality of information and a third storage device for storing said subscriber ID and said password.

404. The system of claim 322, wherein said storage device comprises at least a first storage device for storing said profile data, a second storage device for storing said plurality of information and a third storage device for storing said subscriber ID, said login time, said login date, said logout time, said logout date, said session duration and said session usage records.

405. The system of claim 336, wherein said storage device comprises at least a first storage device for storing said profile data, a second storage device for storing said plurality of information and a third storage device for storing said subscriber ID, said login time, said login date, said logout time, said logout date, said plurality of INFO IDs, said plurality of INFO durations, said list of displayed information, said display date, said display time and said INFO display record.

406. The system of claim 339, wherein said storage device comprises at least a first storage device for storing said profile data, a second storage device for storing said plurality of information and a third storage device for storing said subscriber ID, said login time, said login date, said logout time, said logout date, said plurality of INFO IDs, said plurality of INFO durations, said list of displayed information, said display date, said display time, said location ID and said INFO display record.

407. The system of claim 345, wherein said storage device comprises at least a first storage device for storing said profile data, a second storage device for storing said plurality of information and a third storage device for storing said subscriber ID, said login time, said login date, said logout time, said logout date, said session duration, said location ID and said session usage records.

408. The system of claim 362, wherein said storage device comprises at least a first storage device for storing said profile data, a second storage device for storing said plurality of information and a third storage device for storing said subscriber ID, said plurality of INFO IDs, said plurality of INFO durations, said displayed INFO ID, said selected data provider ID, said display date, said display time, said location ID and said plurality of clicked event records.

409. The system of claim 370, wherein said storage device comprises at least a first storage device for storing said profile data, a second storage device for storing said plurality of information and a third storage device for storing said subscriber ID, said data provider ID, said display date, said display time, said location ID and said plurality of data display records.

410. The system of claim 388, wherein said storage device comprises at least a first storage device for storing said profile data, a second storage device for storing said plurality of information and a third storage device for storing said subscriber ID and said additional profile data.

411. The system of claim 368, wherein said associated processing device further includes a device for generating a plurality of data display records for each plurality of data providers, each data display record containing said profile data, said location ID and said single data provider ID, and said display date and said display time associated with said single data provider ID; and wherein said storage device is operable to store said plurality of data display records for said subscriber.

412. The system of claim 411, wherein said storage device comprises at least a first storage device for storing said profile data, a second storage device for storing said plurality of information and a third storage device for storing said data provider ID, said display date, said display time, said location ID and said plurality of data display records.

413. The system of claim 368, wherein said associated processing device includes:

a device for generating a plurality of data display records for each of said plurality of data providers, each data display record containing said profile data, said location ID and said single data provider ID, and said display date and said display time associated with said single data provider ID;

a local storage device for locally storing said plurality of data display records for said each of said plurality of data providers; and a transmitter for transmitting said plurality of data display records for said each of said plurality of data providers to said storage device connected to said network.

414. The system of claim of 359, wherein said region selector is operable to control said display device to display said additional information in said second portion of said display device.

415. The system of claim 359, wherein said region selector is operable to control said display device to display a request for additional data to said subscriber in said second portion of said display device; wherein said input device is operable to enter said additional data by said subscriber; wherein said associated processing device includes a reading said profile data corresponding to said subscriber ID from said storage device and a device for generating a packet containing said subscriber ID, said profile data and said additional data; and wherein said storage device is operable to store said packet.

* * * * *